United States Patent
Katano et al.

(10) Patent No.: US 12,067,439 B2
(45) Date of Patent: Aug. 20, 2024

(54) CARD-TYPE MEDIA

(71) Applicant: TOPPAN INC., Tokyo (JP)

(72) Inventors: Yukiko Katano, Tokyo (JP); Tetsuya Tsukada, Tokyo (JP); Shinji Kaneko, Tokyo (JP); Shigeki Minemura, Tokyo (JP)

(73) Assignee: TOPPAN INC., Tokyo (JP)

( * ) Notice: Subject to any disclaimer, the term of this patent is extended or adjusted under 35 U.S.C. 154(b) by 25 days.

(21) Appl. No.: 18/079,172

(22) Filed: Dec. 12, 2022

(65) Prior Publication Data

US 2023/0111259 A1   Apr. 13, 2023

Related U.S. Application Data

(63) Continuation of application No. PCT/JP2021/021002, filed on Jun. 2, 2021.

(30) Foreign Application Priority Data

Jun. 15, 2020   (JP) .................................. 2020-103094
Jun. 15, 2020   (JP) .................................. 2020-103095
Jun. 15, 2020   (JP) .................................. 2020-103096

(51) Int. Cl.
*G06K 19/077*   (2006.01)
*G06K 19/07*   (2006.01)

(52) U.S. Cl.
CPC ..... *G06K 19/0775* (2013.01); *G06K 19/0718* (2013.01); *G06K 19/07745* (2013.01); *G06K 19/07773* (2013.01)

(58) Field of Classification Search
CPC ........... G06K 19/0775; G06K 19/0718; G06K 19/07745; G06K 19/07773; B42D 25/313; B42D 25/305
See application file for complete search history.

(56) References Cited

U.S. PATENT DOCUMENTS

2008/0314995 A1   12/2008  Varga et al.
2014/0224886 A1    8/2014  Nihei et al.
(Continued)

FOREIGN PATENT DOCUMENTS

DE    41 05 869 C2    5/2000
JP    03-202397 A     9/1991
(Continued)

OTHER PUBLICATIONS

European Extended Search Report issued in corresponding European Patent Application No. 21825591.7 dated Nov. 7, 2023 (8 pages).

(Continued)

*Primary Examiner* — Matthew Mikels
(74) *Attorney, Agent, or Firm* — Foley & Lardner LLP

(57) ABSTRACT

A card-type medium includes: a card body; an internal component embedded in the card body; an exposed component partially exposed on a front surface of the card body; and a circuit board to which the internal component and the exposed component are bonded, wherein the circuit board includes a first connection portion to which the internal component is bonded, a second connection portion to which the exposed component is bonded, the second connection portion being located at a position different from the first connection portion in a card thickness direction connecting the front surface of the card body and a rear surface on an opposite side of the card body to the front surface, and a connection wiring portion that connects the first connection portion and the second connection portion, the connection wiring portion extending in a direction including the card thickness direction.

13 Claims, 18 Drawing Sheets

(56) References Cited

U.S. PATENT DOCUMENTS

2015/0324683 A1\* 11/2015 Linfield ................ G06K 19/08
                                                   235/492
2019/0102665 A1   4/2019 Snell et al.

FOREIGN PATENT DOCUMENTS

| JP | 2003-141486 A | 5/2003 |
| JP | 2009-075781 A | 4/2009 |
| JP | 2009-205338 A | 9/2009 |
| JP | 2011-521377 A | 7/2011 |
| JP | 2015-212948 A | 11/2015 |
| JP | 3201473 U | 12/2015 |
| JP | 2019-511058 A | 4/2019 |
| WO | WO-2013/073702 A1 | 5/2013 |

OTHER PUBLICATIONS

International Searching Authority, "International Search Report," issued in connection with International Patent Application No. PCT/JP2021/021002, dated Sep. 9, 2021.

International Searching Authority, "Written Opinion," issued in connection with International Patent Application No. PCT/JP2021/0210021, dated Sep. 9, 2021.

\* cited by examiner

CARD-TYPE MEDIA

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/021002, filed on Jun. 2, 2021, which in turn claims the benefit of from Japanese Patent Application Nos. 2020-103094, 2020-103095 and 2020-103096 filed Jun. 15, 2020, the disclosures of all which are incorporated herein by reference in its entirety.

TECHNICAL FIELD

The present invention relates to card-type media.

BACKGROUND

Many types of card-type media have been developed, such as credit cards, cash cards, prepaid cards, membership cards, gift cards, membership certificates, and the like. Further, card-type media (hereinafter, also simply referred to as "IC cards") in which an IC (Integrated Circuit) module or the like having a communication function is embedded to implement various functions are increasingly used in recent years. Such IC cards having a communication function are configured to perform contactless communication with a reader/writer by using an electromagnetic induction communication technology such as RFID (Radio Frequency IDentifier), for example.

IC cards include a card body, in which a circuit board and elements, such as an IC module and an antenna, mounted on the circuit board are embedded. For example, PTL 1 discloses a configuration including a secure element and a fingerprint processing unit which are connected to a flexible circuit board, and a contact pad electrically connected to the secure element.

CITATION LIST

Patent Literature

PTL 1: JP 2019-511058 A; PTL 2: JP 2011-521377 A.

SUMMARY OF THE INVENTION

Technical Problem

In a configuration described in PTL 1, the contact pad is supported by a spacer (extension block) such that the contact pad is exposed on a surface (front surface) of the card body. The spacer is sandwiched between the flexible circuit board and the contact pad. The spacer is electrically coupled to both the flexible circuit board and the contact pad via respective contacts. Therefore, when mounting the contact pad, it is necessary to bond one surface of the spacer to the flexible circuit board and bond the other surface of the spacer to the contact pad. As a result, supporting the component with the spacer increases the number of bonding points. This may cause an increase in time and effort of bonding and an increase in the manufacturing cost when manufacturing IC cards. Further, as the bonding points increase, the risk of occurrence of connection failure may also increase.

PTL 1 describes a configuration in which the contact pad is exposed on a surface (front surface) of the card body. The contact pad is accommodated in the aperture formed in the front surface of the card body.

Furthermore, there are some credit cards using metal for a card body in order to provide a luxurious appearance. For example, PTL 2 discloses a configuration in which a metal sheet is used for a card body and a back panel.

In such a configuration, a gap between an exposed component such as a contact pad exposed on a surface of the card body and an aperture formed in the card body is desired to be as small as possible in terms of appearance. However, when metal is used for the card body and the gap between the exposed component and the aperture is made small, there is a risk that solder or the like, for example, that electrically couples the exposed component to the circuit board may come into contact with the inner wall of the aperture. In such a case, a short circuit may occur if a portion of the aperture formed in the card body is made of metal.

The present invention has been made in view of the above circumstances, and provides a card-type medium capable of preventing an increase in time, effort and cost of manufacturing, and reducing the risk of occurrence of connection failure.

Furthermore, the present invention has been made in view of the above circumstances, and provides a card-type medium capable of preventing an electrical short circuit from occurring between a card body and a component mounted on the card body even when a metal material is used for the card body.

Solution to Problem

A card-type medium according to an aspect of the present invention includes: a card body; an internal component embedded in the card body; an exposed component partially exposed on a front surface of the card body; and a circuit board to which the internal component and the exposed component are bonded, wherein the circuit board includes a first connection portion to which the internal component is bonded, a second connection portion to which the exposed component is bonded, the second connection portion being located at a position different from the first connection portion in a card thickness direction connecting the front surface of the card body and a rear surface on an opposite side of the card body to the front surface, and a connection wiring portion that connects the first connection portion and the second connection portion, the connection wiring portion extending in a direction including the card thickness direction.

A card-type medium according to another aspect of the present invention includes: a card body; a component at least partially embedded in the card body; a circuit board embedded in the card body, the circuit board having a component connection portion to which the component is bonded; and a spacer embedded in the card body, the spacer being located on an opposite side of the component connection portion to the component.

A card-type medium according to another aspect of the present invention includes: a card body formed containing a metal material; an exposed component accommodated in an aperture formed in a front surface of the card body, the exposed component being partially exposed on the front surface; and a circuit board to which the exposed component is bonded, the circuit board being embedded in the card body, wherein the aperture includes a front side aperture located on a front surface side in a card thickness direction connecting the front surface of the card body and a rear surface on an opposite side of the card body to the front surface, and a rear side aperture continuous with the front side aperture and located on a rear surface side in the card thickness direction, the rear side aperture having an aperture size in a plane perpendicular to the card thickness direction larger than that of the front side aperture.

Advantageous Effects of Invention

According to the present invention, a card-type medium capable of preventing an increase in time, effort and cost of manufacturing, and reducing the risk of occurrence of connection failure can be provided.

Further, according to the present invention, a card-type medium capable of preventing an electrical short circuit from occurring between a card body and a component mounted on the card body can be provided even when a metal material is used for the card body.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment of Card-Type Medium

With reference to FIGS. 1 to 22, an IC card according to a first embodiment of the present invention will be described.

Figure 1:
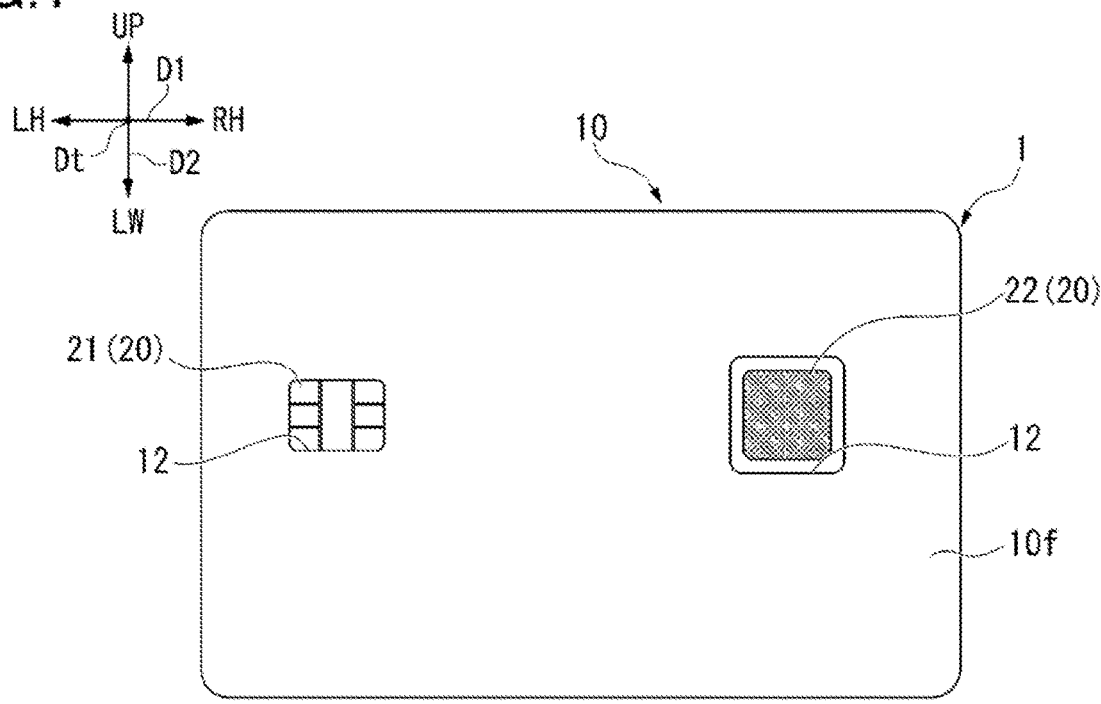
FIG. 1 is an external view of an IC card according to a first embodiment of the present invention as seen from the front.
Figure 2:
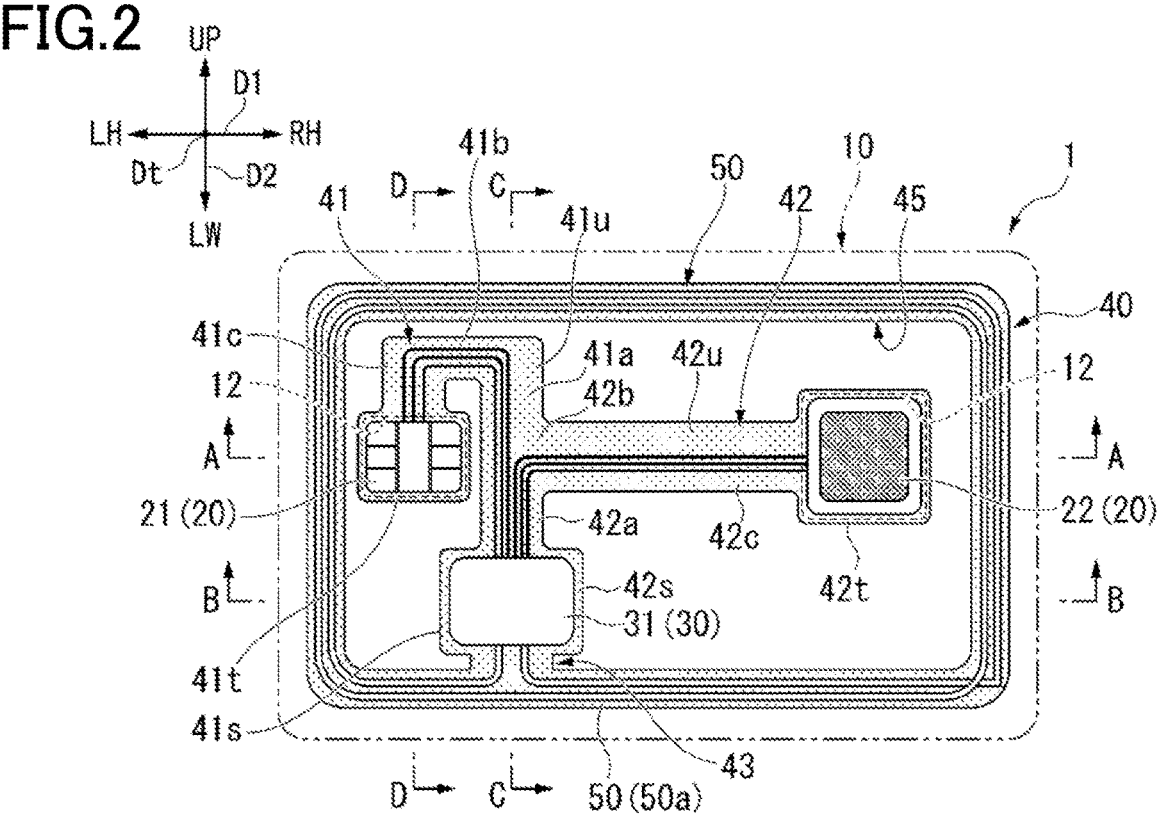
FIG. 2 is a plan view illustrating an exposed component, an internal component and a circuit board provided in the IC card shown in FIG. 1.
Figure 3:
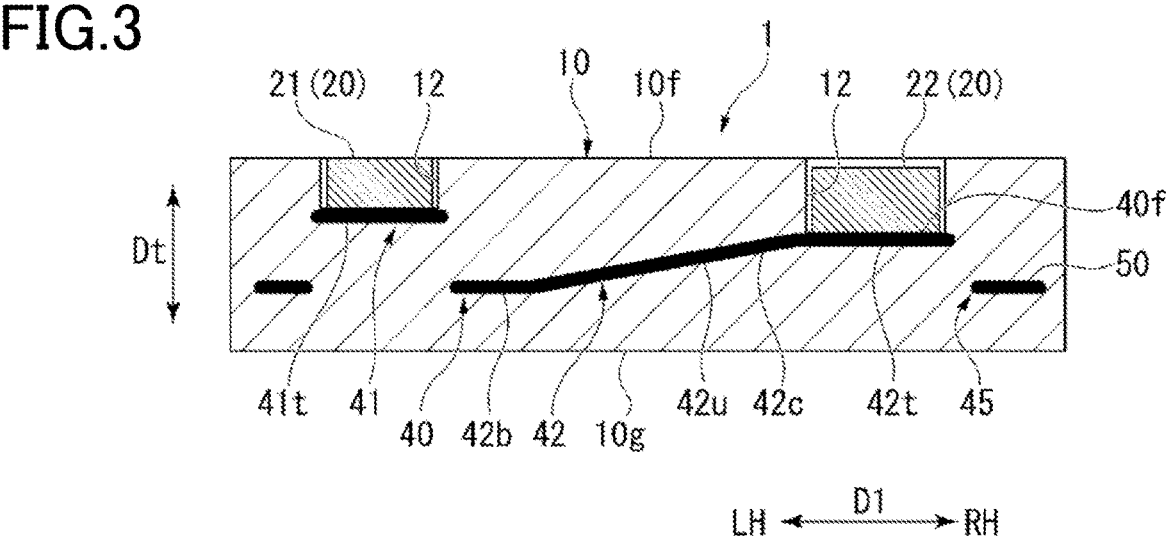
FIG. 3 is a cross-sectional view taken along the line A-A of FIG. 2.
Figure 4:
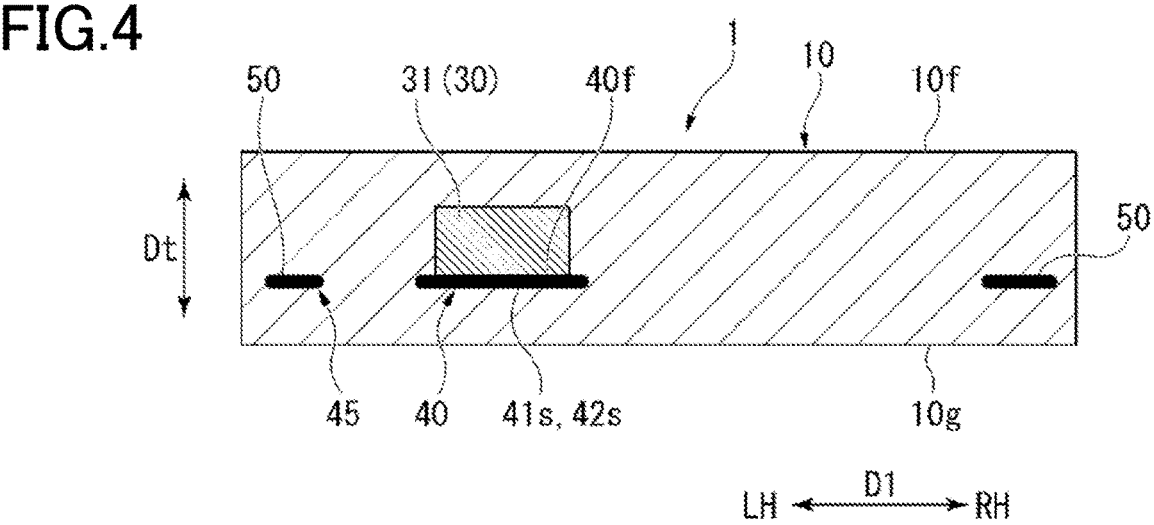
FIG. 4 is a cross-sectional view taken along the line B-B of FIG. 2.
Figure 5:
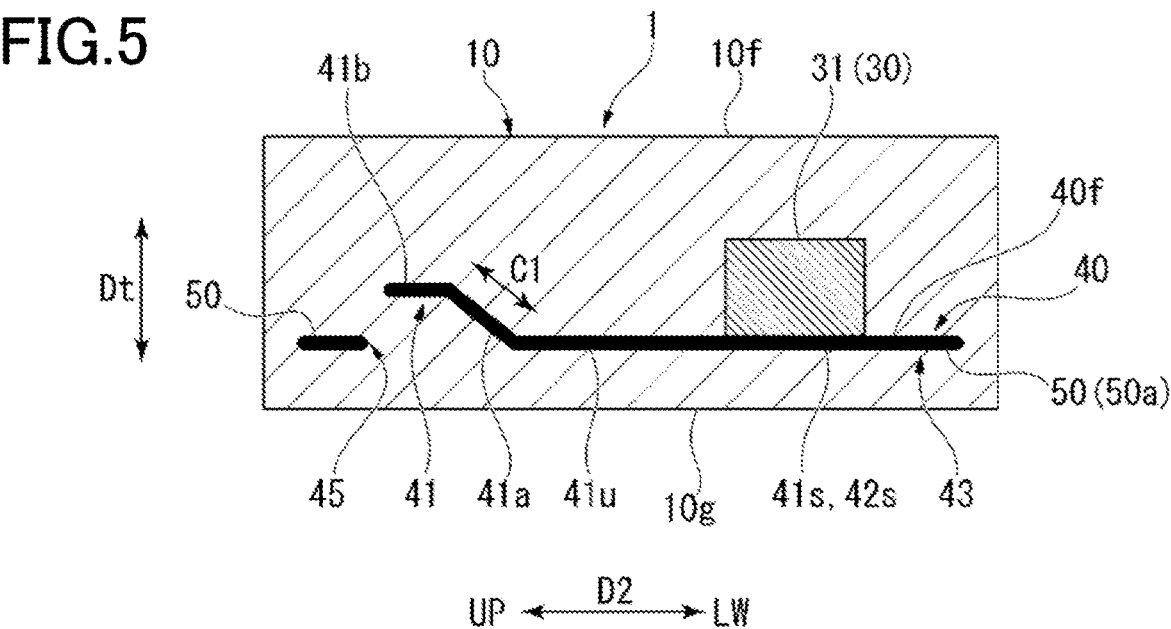
FIG. 5 is a cross-sectional view taken along the line C-C of FIG. 2.
Figure 6:
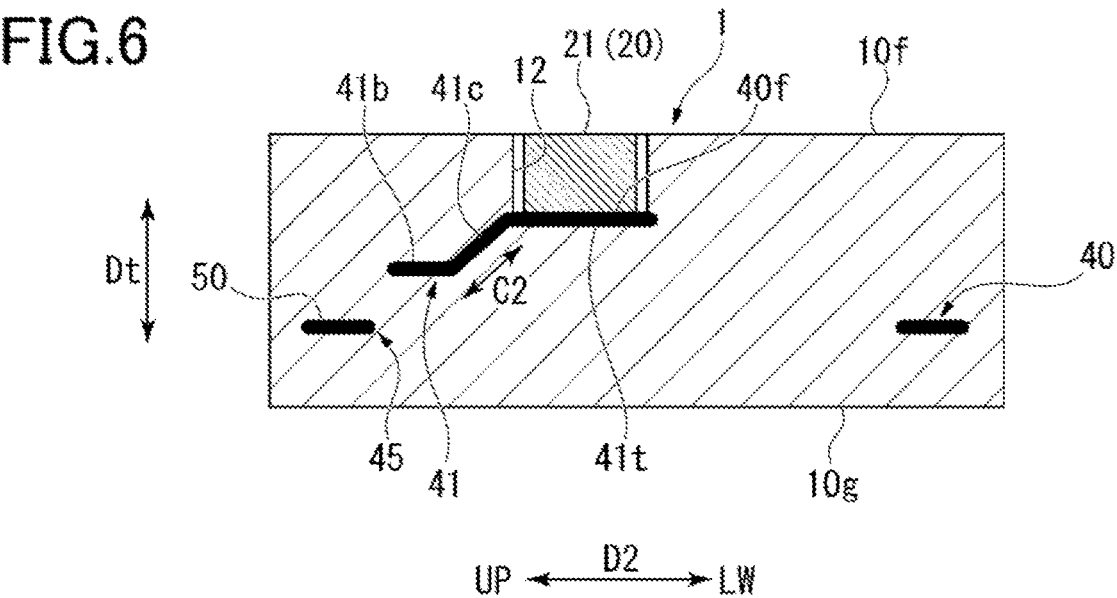
FIG. 6 is a cross-sectional view taken along the line D-D of FIG. 2.

FIG. 1 is an external view of an IC card according to the present embodiment as seen from the front. FIG. 2 is a plan view illustrating an exposed component, an internal component and a circuit board provided in the IC card shown in FIG. 1. FIG. 3 is a cross-sectional view taken along the line A-A of FIG. 2. FIG. 4 is a cross-sectional view taken along the line B-B of FIG. 2. FIG. 5 is a cross-sectional view taken along the line C-C of FIG. 2. FIG. 6 is a cross-sectional view taken along the line D-D of FIG. 2.

As shown in FIGS. 1 to 6, an IC card (card-type medium) 1 is a dual interface IC card including a contact terminal 21 as a contact interface and an antenna 50 as a contactless interface. Further, the IC card 1 has a biometric authentication function using a fingerprint sensor 22. The IC card 1 includes a card body 10, an internal component 30, an exposed component 20, a circuit board 40 and the antenna 50.

The card body 10 is plate-shaped and formed in a rectangular shape as viewed in a card thickness direction Dt perpendicular to a front surface 10f of the card body 10. The card thickness direction Dt herein is a direction penetrating the card body 10 from the front surface 10f to a rear surface 10g. The card body 10 may have a thickness of, for example, approximately 0.5 mm to 1.0 mm in the card thickness direction Dt (for example, when the IC card 1 is a credit card, the card body 10 has a thickness of 0.76 mm).

The card body 10 is made of a polyester-based material such as amorphous polyester, a vinyl chloride-based material such as PVC (polyvinyl chloride), a polycarbonate-based material, or an insulating plastic substrate such as PET-G (polyethylene terephthalate copolymer). Further, the card body 10 may be formed of a metal sheet, a magnetic material, or the like. The card body 10 may be formed into a card shape using a plastic material having high fluidity and insulation, such as a UV curing type or a mixed solution reaction-curing type.

The exposed component 20 is partially exposed on the front surface 10f of the card body 10. In the present embodiment, the IC card 1 includes the contact terminal 21 and the fingerprint sensor 22 as the exposed components 20. The contact terminal 21 and the fingerprint sensor 22 are respectively accommodated in apertures (recesses) 12 formed on the front surface 10f side of the card body 10.

The contact terminal 21 has a rectangular shape when viewed in the card thickness direction Dt. The contact terminal 21 is configured to be in contact with and electrically coupled to external contact terminals of contact type external devices such as an automatic teller machine. The contact terminal 21 is formed by etching a surface of an insulating substrate such as glass epoxy or polyimide (PI) to form a conductive pattern, and plating it with nickel, palladium, gold, or the like. In the present embodiment, the contact terminal 21 is located offset to a first side (LH side) in a long side direction D1 of the front surface 10f of the card body 10 relative to a center part of the front surface 10f of the card body 10.

The fingerprint sensor 22 is plate-shaped and has a rectangular shape when viewed in the card thickness direction Dt. The fingerprint sensor 22 has a configuration in which a plurality of electrodes are covered with a protective film. The fingerprint sensor 22 is located offset to a second side (RH side) in the long side direction D1 of the card body 10 relative to the center part of the front surface 10f of the card body 10.

As shown in FIGS. 2 to 6, the internal component 30 is embedded in the card body 10. In the present embodiment, the IC card 1 includes an IC chip 31 as the internal component 30. The IC chip 31 is electrically coupled to the contact terminal 21, the fingerprint sensor 22 and the antenna 50 (described later) via wiring formed on the circuit board 40. The IC chip 31 is a secure IC microcomputer, and has functions of external communication via the contact terminal 21 and the antenna 50, fingerprint authentication using the fingerprint sensor 22, and the like. A chip with a known configuration having a contact communication function and a contactless communication function can be used as the IC chip 31. The IC chip 31 has a rectangular shape when viewed in the card thickness direction Dt. The IC chip 31 is disposed between the contact terminal 21 and the fingerprint sensor 22 in the long side direction D1. The IC chip 31 is located offset to a first side (LW side) relative to the contact terminal 21 and the fingerprint sensor 22 in a short side direction D2 perpendicular to the long side direction D1 in a plane in which the front surface 10f of the card body 10 extends.

The circuit board 40 is embedded in the card body 10. When viewed in the card thickness direction Dt, the circuit board 40 is located inside the outer edge of the card body 10. The circuit board 40 has a rectangular outer shape when viewed in the card thickness direction Dt. The circuit board 40 may have a thickness of, for example, 15 μm to 50 μm in the card thickness direction Dt.

The circuit board 40 is formed of a flexible circuit board. The circuit board 40 includes a base substrate made of an insulating material such as polyethylene terephthalate (PET), polyethylene naphthalate (PEN), polycarbonate (PC) or polyimide (PI). A predetermined wiring pattern made of a conductive thin film, such as aluminum or copper, formed by etching or the like is disposed on a surface of the base substrate of the circuit board 40.

In the card thickness direction Dt, the circuit board 40 is located on the rear surface 10g side of the contact terminal 21, the fingerprint sensor 22 and the IC chip 31 in the card body 10. The contact terminal 21, the fingerprint sensor 22 and the IC chip 31 are mounted on a substrate surface 40f on the front surface 10f side of the card body 10. The contact terminal 21, the fingerprint sensor 22 and the IC chip 31 are mounted on the substrate surface 40f of the circuit board 40 by soldering, conductive adhesive, thermal pressure welding, or the like.

The antenna 50 extends on the peripheral portion of the circuit board 40 in a rectangular shape when viewed in the card thickness direction Dt. One or multiple turns of the antenna 50 are formed on the peripheral portion of the circuit board 40. The antenna 50 may be formed, for example, as a part of the wiring pattern formed on the circuit board 40. Alternatively, the antenna 50 may be formed separately from the circuit board 40. When the antenna 50 is formed separately from the circuit board 40, the antenna 50 can be formed by, for example, providing a metal plate, a metal foil or a metal wire formed in a predetermined antenna shape. In this case, the antenna 50 is bonded to the wiring pattern of the circuit board 40 by soldering, welding, pressure welding, or the like.

The circuit board 40 includes a contact terminal wiring portion 41, a fingerprint sensor wiring portion 42 and an antenna wiring portion 43.

The contact terminal wiring portion 41 electrically couples (connects) the IC chip 31 and the contact terminal 21 to each other. As shown in FIGS. 2, 5 and 6, the contact terminal wiring portion 41 includes a first connection portion 41s, a second connection portion 41t and a connection wiring portion 41u. The first connection portion 41s is bonded to the IC chip 31. The second connection portion 41t is bonded to the contact terminal 21. The connection wiring portion 41u connects the first connection portion 41s and the second connection portion 41t to each other. The connection wiring portion 41u includes a chip-side wiring portion 41a, a turn-back portion 41b and a terminal-side wiring portion 41c. The chip-side wiring portion 41a extends from the first connection portion 41s toward a second side (UP side) in the short side direction D2. When viewed in the card thickness direction Dt, the turn-back portion 41b is turned back in a U-shape on the second side in the short side direction D2 of the circuit board 40. The terminal-side wiring portion 41c extends from the turn-back portion 41b toward the first side (LW side) in the short side direction D2, and is continuous with the second connection portion 41t.

The fingerprint sensor wiring portion 42 electrically couples the IC chip 31 and the fingerprint sensor 22 to each other. As shown in FIGS. 2 to 4, the fingerprint sensor wiring portion 42 includes a first connection portion 42s, a second connection portion 42t and a connection wiring portion 42u. The first connection portion 42s is bonded to the IC chip 31. The second connection portion 42t is bonded to the fingerprint sensor 22. The connection wiring portion 42u connects the first connection portion 42s and the second connection portion 42t to each other. The connection wiring portion 42u includes a chip-side wiring portion 42a, a bent portion 42b and a sensor-side wiring portion 42c. The chip-side wiring portion 42a extends, along with the chip-side wiring portion 41a, from the first connection portion 42s toward the second side (UP side) in the short side direction D2. When viewed in the card thickness direction Dt, the bent portion 42b is bent in an L-shape at an intermediate portion in the short side direction D2 of the circuit board 40. The sensor-side wiring portion 42c extends from the bent portion 42b toward the second side (RH side) in the long side direction D1, and is continuous with the second connection portion 42t.

The antenna wiring portion 43 electrically couples the IC chip 31 and the antenna 50 to each other. As shown in FIGS. 2 and 5, the antenna wiring portion 43 is located on the opposite side of the IC chip 31 to the contact terminal wiring portion 41 and the fingerprint sensor wiring portion 42 in the short side direction D2. The antenna wiring portion 43 extends from the IC chip 31 toward the first side in the short side direction D2, and is connected to a long side portion 50a of the antenna 50.

As shown in FIG. 2, the circuit board 40 includes a cutout portion 45. The cutout portion 45 is an aperture formed by cutting out the circuit board 40 along the outer edge of the contact terminal wiring portion 41, the fingerprint sensor wiring portion 42 and the antenna wiring portion 43. Thus, the contact terminal wiring portion 41, the fingerprint sensor wiring portion 42 and the antenna wiring portion 43 are each formed in a band shape extending in an extending direction of each portion.

As shown in FIGS. 3, 5 and 6, in the card thickness direction Dt, the contact terminal 21 and the fingerprint sensor 22 are located offset to the front surface 10f of the card body 10 relative to the IC chip 31. Accordingly, the second connection portion 41t of the contact terminal wiring portion 41 to which the contact terminal 21 is bonded is located at a different position in the card thickness direction Dt from the first connection portion 41s. The second connection portion 42t of the fingerprint sensor wiring portion 42 to which the fingerprint sensor 22 is bonded is located at a different position in the card thickness direction Dt from the first connection portion 42s. The second connection portions 41t and 42t are located closer to the front surface 10f in the card thickness direction Dt than the first connection portions 41s and 42s are. The first connection portion 41s of the contact terminal wiring portion 41 and the first connection portion 42s of the fingerprint sensor wiring portion 42 are located at the same position in the card thickness direction Dt (i.e. in the same plane) as the antenna 50 and the antenna wiring portion 43.

As shown in FIG. 5, the chip-side wiring portion (first inclined portion) 41a of the contact terminal wiring portion 41 extends from the first connection portion 41s toward the second side (UP side) in the short side direction D2 while being inclined toward the front surface 10f in the card thickness direction Dt, and is connected to the turn-back portion 41b. As shown in FIG. 6, the terminal-side wiring portion (second inclined portion) 41c of the contact terminal wiring portion 41 extends from the turn-back portion 41b toward the first side (LW side) in the short side direction D2 while being inclined toward the front surface 10f in the card thickness direction Dt, and is connected to the second connection portion 41t. Thus, the connection wiring portion 41u that connects the first connection portion 41s and the second connection portion 41t to each other extends in a direction including the card thickness direction Dt. The term "direction including the card thickness direction Dt" as used herein refers to a direction inclined relative to the card thickness direction Dt, such as the directions in which each of the chip-side wiring portion 41a and the terminal-side wiring portion 41c of the connection wiring portion 41u extends. The direction including the card thickness direction Dt may also be the card thickness direction Dt. In other words, the chip-side wiring portion 41a and the terminal-side wiring portion 41c may also extend in the card thickness direction Dt between the first connection portion 41s and the second connection portion 41t.

As shown in FIG. 5, the chip-side wiring portion 41a as the first inclined portion extends toward the second side (UP side) in the short side direction D2 which is perpendicular to the card thickness direction Dt while being inclined toward the front surface 10f in the card thickness direction Dt. The direction in which the chip-side wiring portion 41a extends is defined as a first direction C1. As shown in FIG. 6, the terminal-side wiring portion 41c as the second inclined portion extends toward the first side (LW side) in the short side direction D2 different from the second side (UP side) in the short side direction D2 which is perpendicular to the card thickness direction Dt while being inclined toward the front surface 10f in the card thickness direction Dt. The direction in which the terminal-side wiring portion 41c extends is defined as a second direction C2. The first direction C1 and the second direction C2 are directions different from each other, and the chip-side wiring portion 41a as the first inclined portion and the terminal-side wiring portion 41c as the second inclined portion are inclined in directions different from each other relative to the card thickness direction Dt. The directions in which the chip-side wiring portion 41a and the terminal-side wiring portion 41c extend are not limited to the above-mentioned directions. For example, the chip-side wiring portion 41a as the first inclined portion may extend while being inclined toward the short side direction D2, and the terminal-side wiring portion 41c as the second inclined portion may extend while being inclined toward the long side direction D1. Further, the first direction C1 and the second direction C2 may be the same direction.

As shown in FIGS. 2 and 3, the sensor-side wiring portion 42c of the fingerprint sensor wiring portion 42 extends from the bent portion 42b toward the second side (RH side) in the long side direction D1 while being inclined toward the front surface 10f in the card thickness direction Dt, and is connected to the second connection portion 42t. Thus, the connection wiring portion 42u that connects the first connection portion 42s and the second connection portion 42t to each other extends in a direction including the card thickness direction Dt. The connection wiring portion 42u may extend in the card thickness direction Dt between the first connection portion 42s and the second connection portion 42t.

As shown in FIGS. 2, 3 and 6, when viewed in the card thickness direction Dt, the second connection portion 41t of the contact terminal wiring portion 41 is formed to be large and protrudes outward from the contact terminal 21. When viewed in the card thickness direction Dt, the second connection portion 42t of the fingerprint sensor wiring portion 42 is formed to be large and protrudes outward from the fingerprint sensor 22. The second connection portions 41t and 42t are positioned to cover (close) the apertures 12 of the card body 10, in which the contact terminal 21 and the fingerprint sensor 22 are respectively accommodated, from the rear surface 10g side in the card thickness direction Dt.

Figure 7:
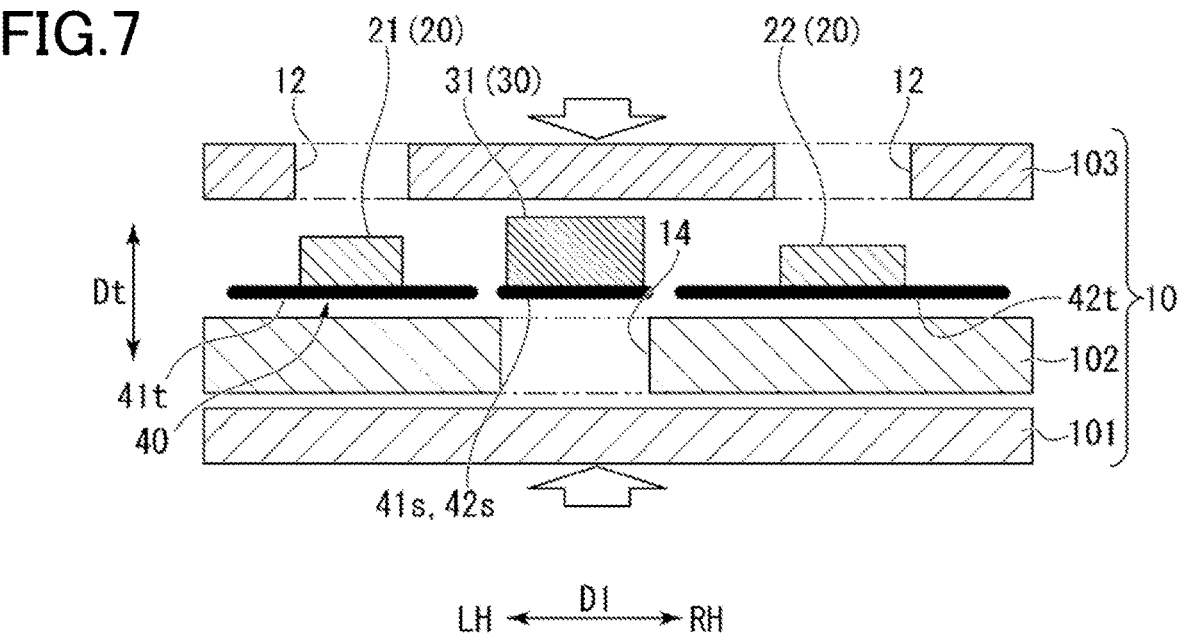
FIG. 7 is a cross-sectional view illustrating a manufacturing process in which an IC card according to the first embodiment of the present embodiment is manufactured by laminating a plurality of card substrates.
Figure 8:
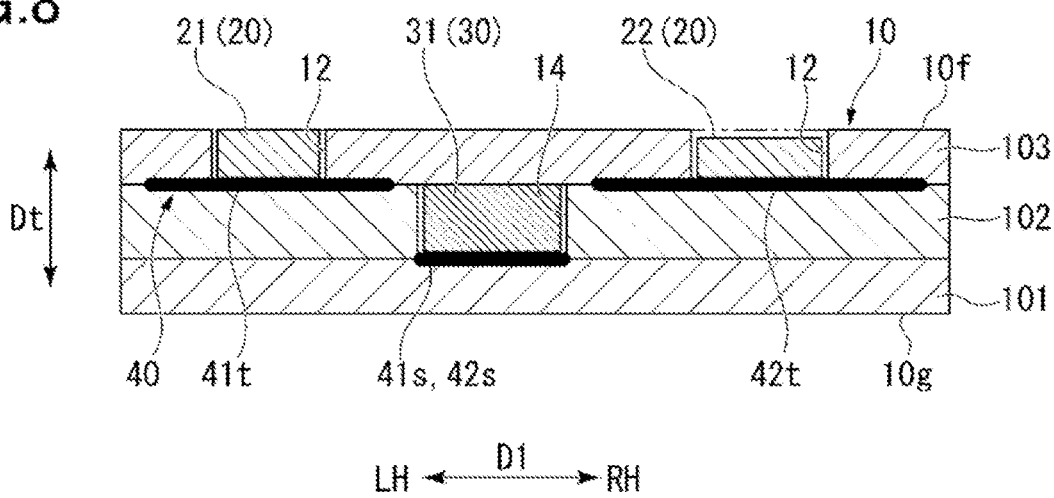
FIG. 8 is a cross-sectional view of an IC card manufactured by laminating the plurality of card substrates shown in FIG. 7.

FIG. 7 is a cross-sectional view illustrating a manufacturing process in which an IC card according to the present embodiment is manufactured by laminating a plurality of card substrates. FIG. 8 is a cross-sectional view of an IC card manufactured by laminating the plurality of card substrates shown in FIG. 7.

As shown in FIGS. 7 and 8, the card body 10 of the IC card 1 described above can be configured by laminating a plurality of sheet-shaped card substrates 101, 102 and 103 in the card thickness direction Dt. In this case, the card substrate 103 disposed on a front surface 10f side of the card body 10 has the apertures 12 that accommodate the contact terminal 21 and the fingerprint sensor 22, respectively. The apertures 12 penetrates through the card substrate 103 in the card thickness direction Dt. The apertures 12 are closed by the second connection portions 41t and 42t, respectively, from the rear surface 10g side.

The card substrate 102, which is located between the card substrate 101 disposed on a rear surface 10g side and the card substrate 103 disposed on a front surface 10f side in the card thickness direction Dt, has an internal aperture 14. The internal aperture 14 accommodates the IC chip 31 which is the internal component 30.

The card substrates 101, 102 and 103 are integrated by a converting process such as heat press lamination or adhesive lamination to form an IC card 1 having the contact terminal 21, the fingerprint sensor 22 and the IC chip 31.

Figure 9:
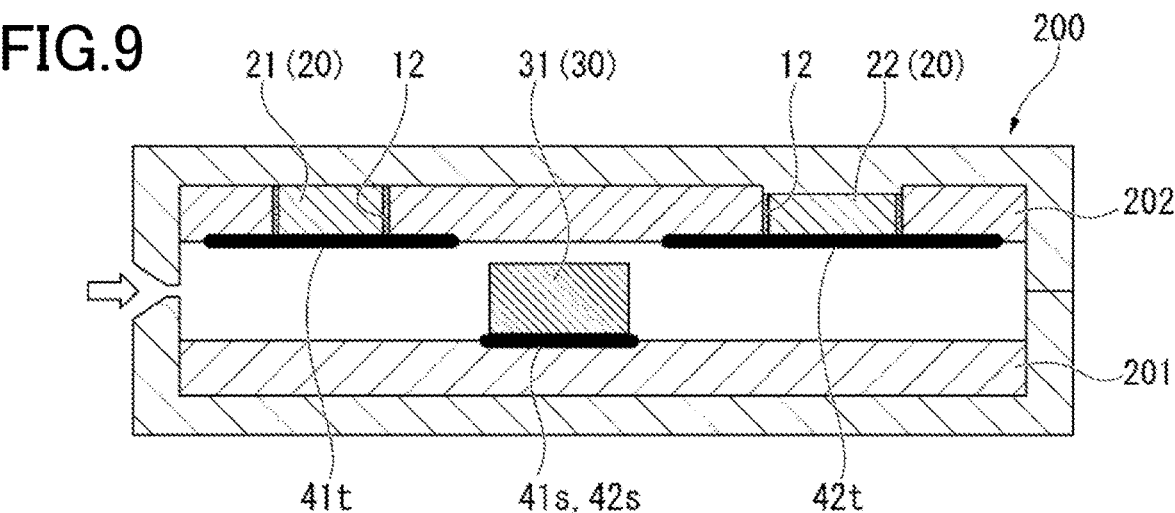
FIG. 9 is a cross-sectional view illustrating a manufacturing process in which an IC card according to the first embodiment of the present embodiment is manufactured by injecting a resin material into a mold, followed by curing.
Figure 10:
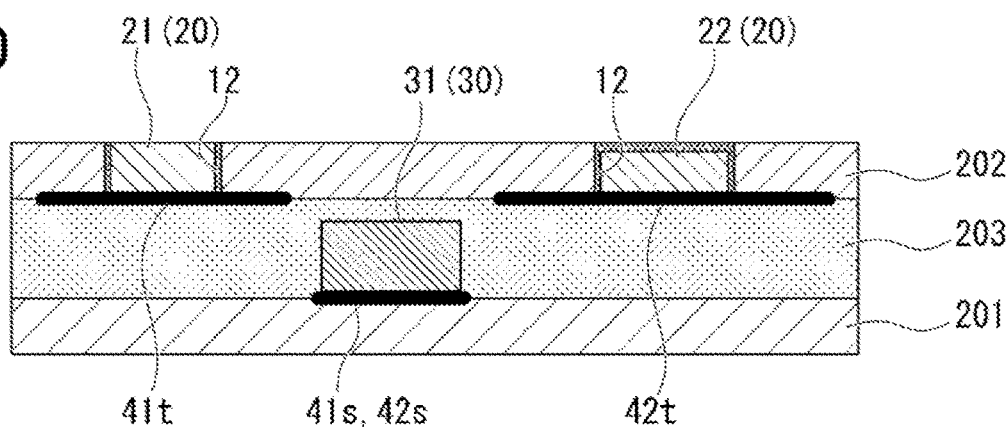
FIG. 10 is a cross-sectional view illustrating an IC card formed by using the mold shown in FIG. 9.

FIG. 9 is a cross-sectional view illustrating a manufacturing process in which an IC card according to the present embodiment is manufactured by injecting a resin material into a mold, followed by curing. FIG. 10 is a cross-sectional view illustrating an IC card formed by using the mold shown in FIG. 9.

As shown in FIGS. 9 and 10, the card body 10 of the IC card 1 described above can be formed by resin molding using a mold 200. In this case, the card substrate 202 disposed on the front surface 10f side and the card substrate 201 disposed on a rear surface 10g side are placed in the mold 200 in advance. The card substrate 202 has the apertures 12 that accommodate the contact terminal 21 and the fingerprint sensor 22, respectively. The apertures 12 penetrates through the card substrate 202 in the card thickness direction Dt. The apertures 12 are closed by the second connection portions 41t and 42t, respectively, from the rear surface 10g side. The IC chip 31 is fixed on the card substrate 201 in advance.

A resin material 203 such as thermosetting, UV curing or mixed solution reaction-curing resin is injected into a space between the card substrate 201 and the card substrate 202 in the mold 200, and cured to form an IC card 1 having the contact terminal 21, the fingerprint sensor 22 and the IC chip 31. In this step, since the apertures 12 are closed by the second connection portions 41t and 42t from the rear surface 10g side, the resin material 203 injected into the mold 200 is prevented from entering the apertures 12.

The IC card 1 of the present embodiment includes the exposed components 20 partially exposed on the front surface 10f of the card body 10, and the internal component 30 embedded in the card body 10. Accordingly, the internal component 30 is located at a different position in the card thickness direction Dt from the exposed components 20. In this configuration, the first connection portions 41s and 42s to which the internal component 30 is bonded are located at different positions in the card thickness direction Dt from the second connection portions 41t and 42t to which the exposed components 20 are respectively bonded. The connection wiring portions 41u and 42u that connect the first connection portions 41s and 42s and the second connection portions 41t and 42t to each other, respectively, extend in a direction including the card thickness direction Dt. Accordingly, the internal component 30 can be directly connected to the first connection portions 41s and 42s, and the exposed components 20 can be directly connected to the second connection portions 41t and 42t, respectively, without using a spacer. Therefore, it is possible to provide an IC card 1 capable of preventing an increase in time, effort and cost of manufacturing, and reducing the risk of occurrence of connection failure.

According to the IC card 1 of the present embodiment, the circuit board 40 includes the cutout portion 45 cut out along the outer edge of the contact terminal wiring portion 41 and the fingerprint sensor wiring portion 42, including the first connection portions 41s and 42s, the second connection portions 41t and 42t, and the connection wiring portions 41u and 42u. Accordingly, the contact terminal wiring portion 41 and the fingerprint sensor wiring portion 42 are each formed in a band shape extending in an extending direction of each portion. Therefore, it becomes easy to arrange the connection wiring portions 41u and 42u so that they extend in a direction including the card thickness direction Dt.

According to the IC card 1 of the present embodiment, the connection wiring portions 41u and 42u extend while being inclined toward the front surface 10f in the card thickness direction Dt, in the extending directions of the connection wiring portions 41u and 42u. Accordingly, the connection wiring portions 41u and 42u can be disposed in a direction including the card thickness direction Dt between the first connection portions 41s and 42s and the second connection portions 41t and 42t, respectively. As a result, the internal component 30 and the exposed components 20 can be supported at different positions in the card thickness direction Dt without using a spacer.

According to the IC card 1 of the present embodiment, the connection wiring portion 41u of the contact terminal wiring portion 41 includes the chip-side wiring portion 41a extending toward the second side (first direction) in the short side direction D2 while being inclined relative to the card thickness direction Dt, and the terminal-side wiring portion 41c extending toward the first side (direction different from the first direction) in the short side direction D2 while being inclined relative to the card thickness direction Dt. Accordingly, the first connection portion 41s and the second connection portion 41t can be disposed at different positions in the card thickness direction Dt in a limited space.

According to the IC card 1 of the present embodiment, the card body 10 includes the apertures 12 on the front surface 10f in which the exposed components 20 are respectively accommodated. Each of the second connection portions 41t and 42t covers the entire aperture 12, in which the exposed component 20 is accommodated, from the rear surface 10g side in the card thickness direction Dt. Since the apertures 12 are thus covered with the second connection portions 41t and 42t from the rear surface 10g side, the resin material is prevented from entering the apertures 12 in manufacturing of the card body 10 by resin molding.

Second Embodiment of Card-Type Medium

A second embodiment of the card-type medium of the present invention will be described below with reference to the drawings. In the following description, components that are common to those described above are denoted by the same reference signs, and duplicated description thereof will be omitted. Each of the following embodiments differs from the first embodiment in a circuit board 40B. Therefore, the following description will be given focusing on the differences from the first embodiment.

Figure 11:
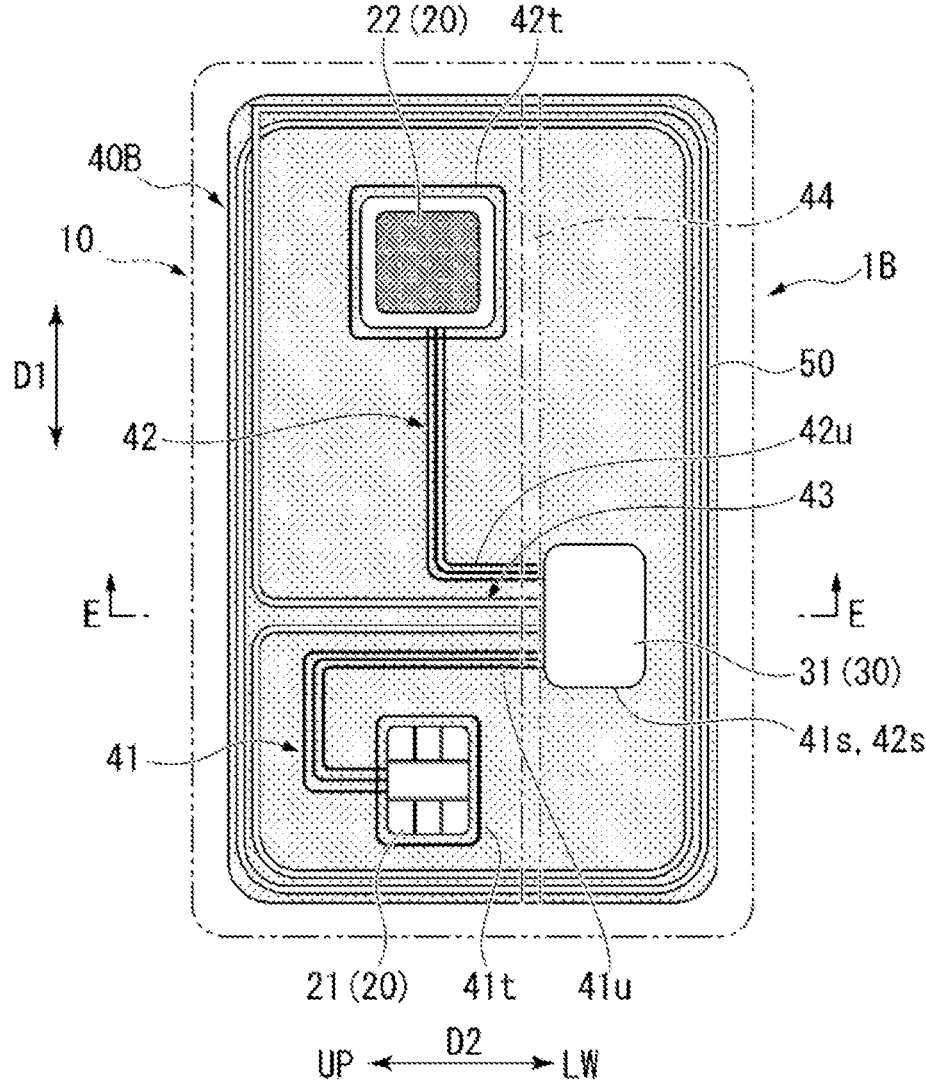
FIG. 11 is a plan view illustrating an exposed component, an internal component and a circuit board provided in an IC card according to a second embodiment of the present invention.
Figure 12:
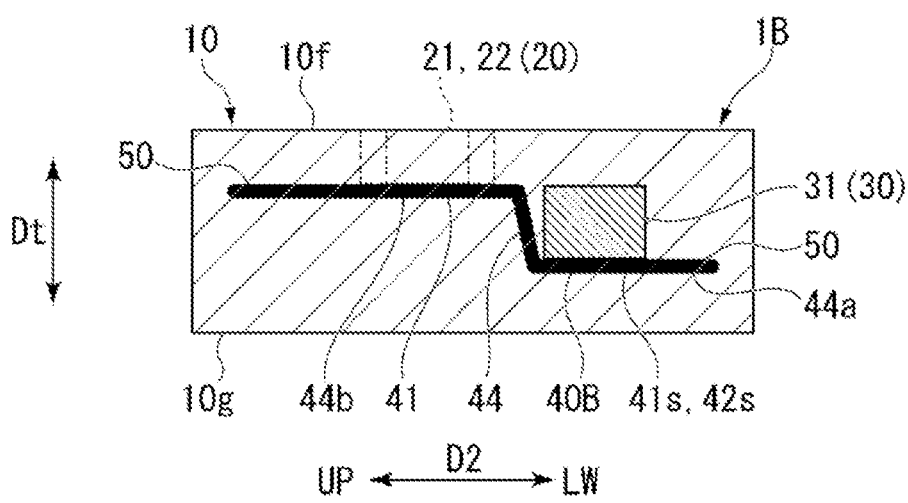
FIG. 12 is a cross-sectional view taken along the line E-E of FIG. 11.

As shown in FIGS. 11 and 12, an IC card 1B includes the card body 10, the internal component 30, the exposed component 20, the circuit board 40B and the antenna 50.

The internal component 30 (IC chip 31), and the first connection portion 41s of the contact terminal wiring portion 41 and the first connection portion 42s of the fingerprint sensor wiring portion 42 to which the internal component 30 is bonded are located on the first side (LW side) in the short side direction D2 of the front surface 10f of the card body 10. The exposed components 20 (contact terminal 21 and fingerprint sensor 22), and the second connection portion 41t of the contact terminal wiring portion 41 and the second connection portion 42t of the fingerprint sensor wiring portion 42 to which the exposed components 20 are respectively bonded are located on the second side (UP side) in the short side direction D2 of the front surface 10f of the card body 10. Further, in the present embodiment, the antenna wiring portion 43 extends from the IC chip 31 toward the second side (RH side) in the short side direction D2, and is connected to the antenna 50. The connection wiring portion 41u of the contact terminal wiring portion 41 and the connection wiring portion 42u of the fingerprint sensor wiring portion 42 extend, along with the antenna wiring portion 43, from the IC chip 31 in the short side direction D2 of the front surface 10f.

In the present embodiment, the cutout portion 45 (see FIG. 2) is not provided in the circuit board 40B. The circuit board 40B has a folded portion 44 bent in a crank shape when viewed in the long side direction D1 between the first side and the second side in the short side direction D2 of the front surface 10f. Accordingly, the circuit board 40B includes a portion 44a in which the internal component 30 (IC chip 31) is disposed on the first side in the short side direction D2 and a portion 44b in which the exposed components 20 (contact terminal 21 and fingerprint sensor 22) are disposed on the second side in the short side direction D2, and the portion 44a and the portion 44b are located at different positions in the card thickness direction Dt. In the folded portion 44, the connection wiring portion 41u of the contact terminal wiring portion 41 and the connection wiring portion 42u of the fingerprint sensor wiring portion 42 extend in a direction including the card thickness direction Dt.

In the IC card 1B of the present embodiment, the internal component 30 is located at a different position in the card thickness direction Dt from the exposed components 20. The first connection portions 41s and 42s to which the internal component 30 is bonded are located at different positions in the card thickness direction Dt from the second connection portions 41t and 42t to which the exposed components 20 are respectively bonded. The connection wiring portions 41u and 42u that connect the first connection portions 41s and 42s and the second connection portions 41t and 42t to each other, respectively, extend in a direction including the card thickness direction Dt in the folded portion 44 of the circuit board 40B. Accordingly, the internal component 30 can be directly connected to the first connection portions 41s and 42s, and the exposed components 20 can be directly connected to the second connection portions 41t and 42t, respectively, without using a spacer. Therefore, it is possible to provide an IC card 1B capable of preventing an increase in time, effort and cost of manufacturing, and reducing the risk of occurrence of connection failure.

Third Embodiment of Card-Type Medium

A third embodiment of the card-type medium of the present invention will be described below with reference to the drawings.

Figure 13:
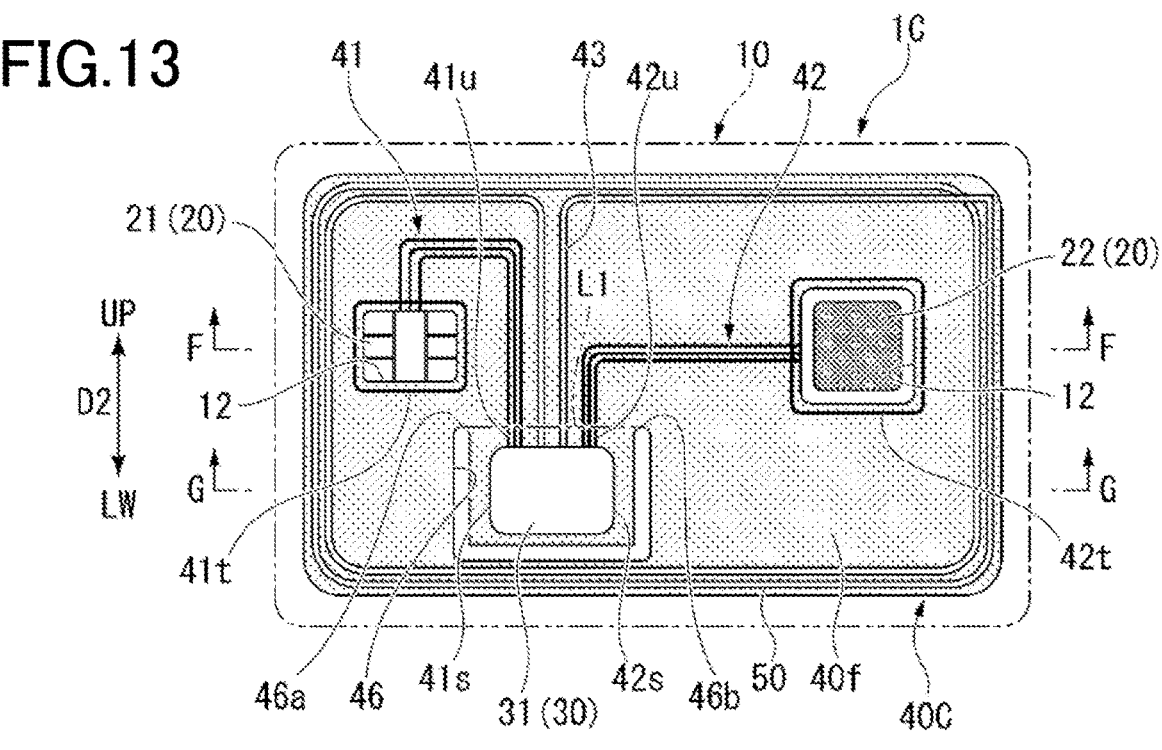
FIG. 13 is a plan view illustrating an exposed component, an internal component and a circuit board provided in an IC card according to a third embodiment of the present invention.
Figure 14:
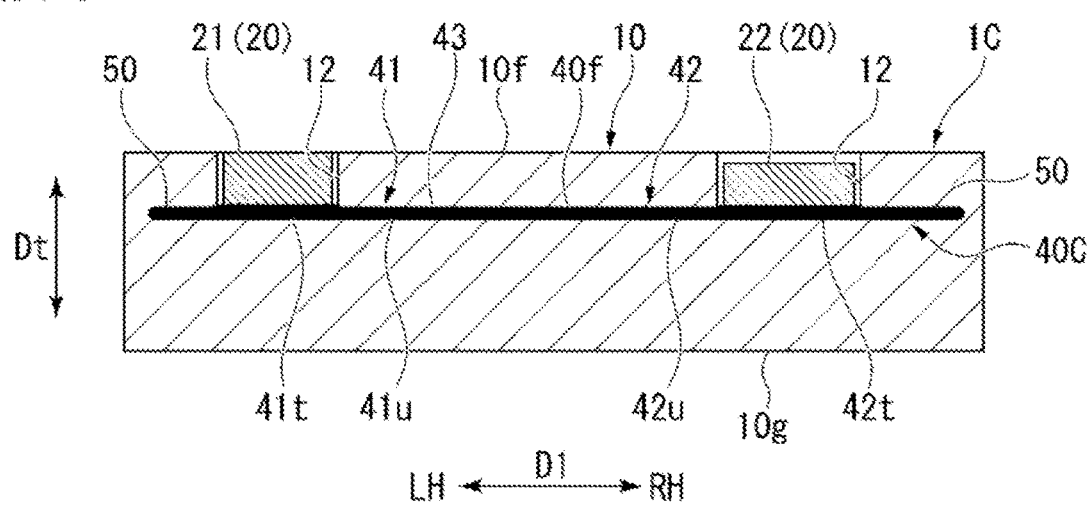
FIG. 14 is a cross-sectional view taken along the line F-F of FIG. 13.
Figure 15:
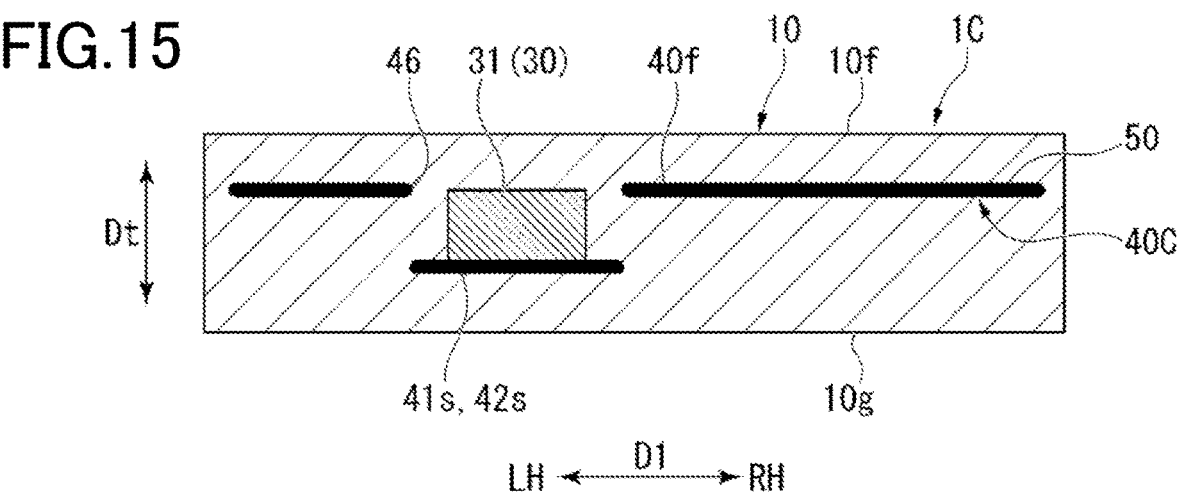
FIG. 15 is a cross-sectional view taken along the line G-G of FIG. 13.

As shown in FIGS. 13 to 15, an IC card 1C includes the card body 10, the internal component 30, the exposed component 20, a circuit board 40C and the antenna 50.

In the circuit board 40C of the present embodiment, the second connection portion 41t of the contact terminal wiring portion 41 and the second connection portion 42t of the fingerprint sensor wiring portion 42 are located at the same position in the card thickness direction Dt (i.e. in the same plane) as the antenna 50 and the antenna wiring portion 43. The circuit board 40C has a slit 46. The slit 46 penetrates through the circuit board 40C in the card thickness direction Dt. The slit 46 extends continuously on the substrate surface 40f of the circuit board 40. The slit 46 surrounds the first connection portion 41s of the contact terminal wiring portion 41 and the first connection portion 42s of the fingerprint sensor wiring portion 42 to which the IC chip 31 is bonded. The slit 46 extends along three sides of the first connection portions 41s and 42s, except for a portion where the connection wiring portions 41u and 42u are connected to the first connection portions 41s and 42s, respectively. A part of the slit 46 is formed around the connection wiring portions 41u and 42u. A part of the slit 46 extends continuously in the extending direction of the connection wiring portions 41u and 42u on both sides of the connection wiring portions 41u and 42u.

The above circuit board 40C is bent along a line L1 connecting a first slit end 46a and a second slit end 46b of the slit 46. Accordingly, the connection wiring portions 41u and 42u are bent in the vicinity of the IC chip 31 at positions intersecting with the line L1. As a result, the first connection portion 41s of the contact terminal wiring portion 41 and the first connection portion 42s of the fingerprint sensor wiring portion 42 to which the IC chip 31 are bonded are located at different positions from the second connection portions 41t and 42t in the card thickness direction Dt.

The circuit board 40C is bent along the line L1 connecting the first slit end 46a and the second slit end 46b of the slit 46. Therefore, it is preferred to set the positions of the first slit end 46a and the second slit end 46b of the slit 46 so that the line L1 does not interfere with the IC chip 31 and is positioned away from the IC chip 31 toward the outer periphery of the circuit board 40C.

In the IC card 1C of the present embodiment, the internal component 30 is located at a different position in the card thickness direction Dt from the exposed components 20. The first connection portions 41s and 42s to which the internal component 30 is bonded are located at different positions in the card thickness direction Dt from the second connection portions 41t and 42t to which the exposed components 20 are respectively bonded. The connection wiring portions 41u and 42u that connect the first connection portions 41s and 42s and the second connection portions 41t and 42t to each other, respectively, extend in a direction including the card thickness direction Dt. Accordingly, the internal component 30 can be directly connected to the first connection portions 41s and 42s, and the exposed components 20 can be directly connected to the second connection portions 41t and 42t, respectively, without using a spacer. Therefore, it is possible to provide an IC card 1C capable of preventing an increase in time, effort and cost of manufacturing, and reducing the risk of occurrence of connection failure.

According to the IC card 1C of the present embodiment, the circuit board 40 includes the slit 46 formed around the first connection portions 41s and 42s and the connection wiring portions 41u and 42u. The slit 46 facilitates bending a part of the circuit board 40C and arranging the connection wiring portions 41u and 42u so that they extend in a direction including the card thickness direction Dt.

First Modified Example of Third Embodiment of Card-Type Medium

In the third embodiment described above, the slit 46 extends along three sides of the first connection portions 41s and 42s. However, the invention is not limited thereto.

Figure 16:
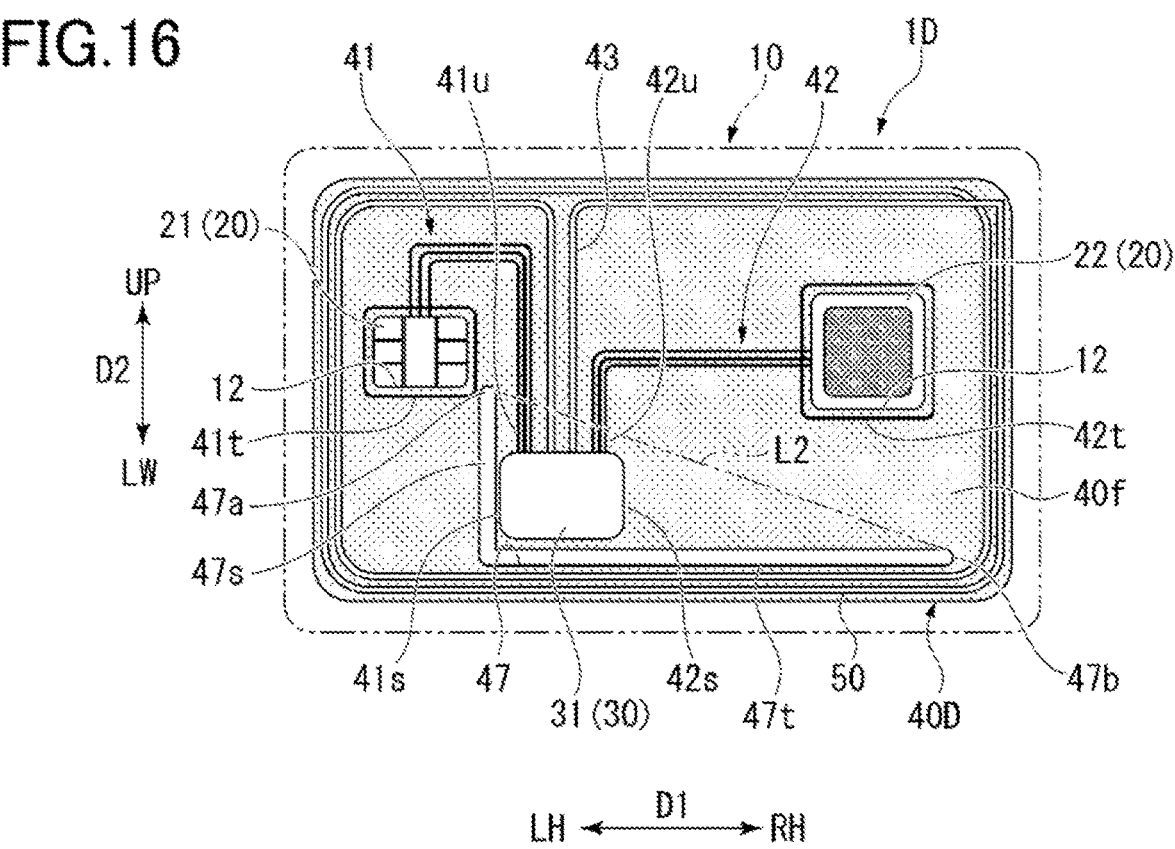
FIG. 16 is a plan view illustrating an exposed component, an internal component and a circuit board provided in an IC card according to a first modified example of the third embodiment of the present invention.

For example, as shown in FIG. 16, in an IC card 1D as a modified example of the IC card 1C, a slit 47 formed in a circuit board 40D has an L-shape when viewed in the card thickness direction Dt. The slit 47 includes a portion 47s extending in the short side direction D2 on a side of the first connection portions 41s and 42s, and a portion 47t extending in the long side direction D1 on the first side in the short side direction D2 of the first connection portions 41s and 42s.

The circuit board 40D is bent along a line L2 connecting a first slit end 47a and a second slit end 47b of the slit 47. Accordingly, the connection wiring portions 41u and 42u are bent in the vicinity of the IC chip 31 at positions intersecting with the line L2. As a result, the first connection portion 41s of the contact terminal wiring portion 41 and the first connection portion 42s of the fingerprint sensor wiring portion 42 to which the IC chip 31 are bonded are located at different positions from the second connection portions 41t and 42t in the card thickness direction Dt.

The circuit board 40D is thus bent along the line L2 connecting the first slit end 47a and the second slit end 47b of the slit 47. Therefore, it is preferred to set the positions of the first slit end 47a and the second slit end 47b of the slit 47 so that the line L2 does not interfere with the IC chip 31 and is positioned away from the IC chip 31 toward the outer periphery of the circuit board 40D.

Second Modified Example of Third Embodiment of Card-Type Medium

Figure 17:
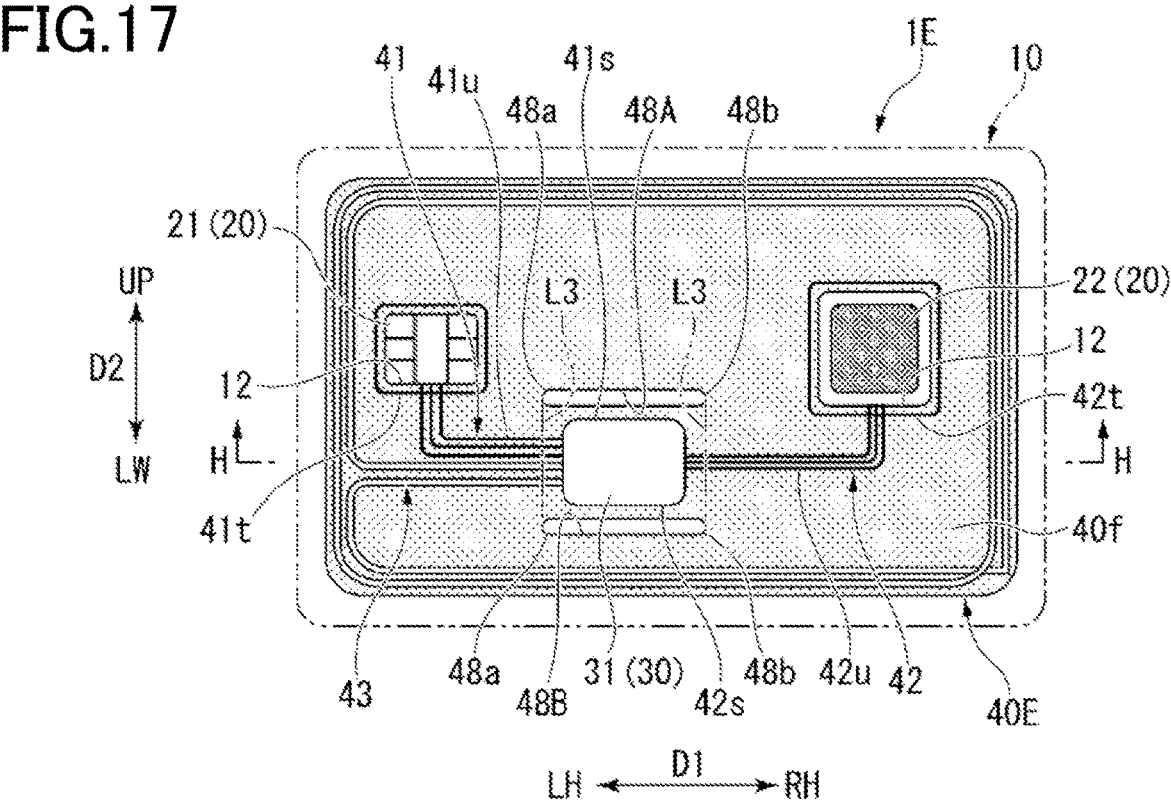
FIG. 17 is a plan view illustrating an exposed component, an internal component and a circuit board provided in an IC card according to a second modified example of the third embodiment of the present invention.
Figure 18:
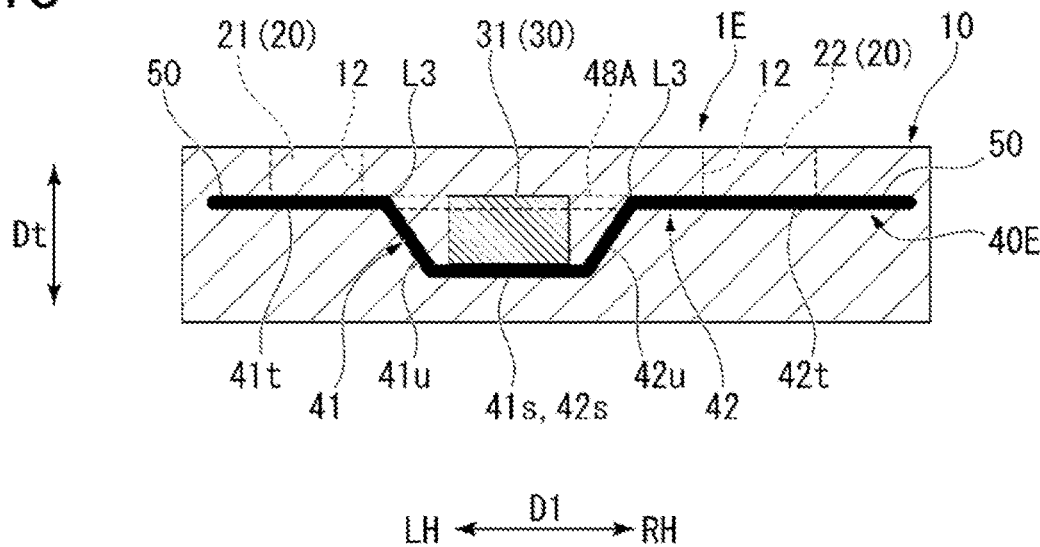
FIG. 18 is a cross-sectional view taken along the line H-H of FIG. 17.

As shown in FIGS. 17 and 18, in an IC card 1E as a modified example of the IC card 1C, the IC chip 31 is located between the contact terminal 21 and the fingerprint sensor 22 in the long side direction D1. In a circuit board 40E, the connection wiring portion 41u of the contact terminal wiring portion 41 and the connection wiring portion 42u of the fingerprint sensor wiring portion 42 are located on both sides of the IC chip 31 (first connection portions 41s and 42s) in the long side direction D1. Both the connection wiring portion 41u of the contact terminal wiring portion 41 and the connection wiring portion 42u of the fingerprint sensor wiring portion 42 extend in the long side direction D1.

The circuit board 40E has slits 48A and 48B. The slits 48A and 48B are formed around the first connection portions 41s and 42s to which the IC chip 31 is bonded and the connection wiring portions 41u and 42u. The slits 48A and 48B are located on both sides of the IC chip 31 in the short side direction D2. Each of the slits 48A and 48B extends in the long side direction D1 between both sides of the first connection portions 41s and 42s to which the IC chip 31 is bonded.

The circuit board 40E is bent along lines L3 each connecting a slit end 48a and a slit end 48b at both ends of the respective slits 48A and 48B in the long side direction D1. Accordingly, the connection wiring portions 41u and 42u are bent in the vicinity of the IC chip 31 at positions intersecting with the lines L3. As a result, the first connection portion 41s of the contact terminal wiring portion 41 and the first connection portion 42s of the fingerprint sensor wiring portion 42 to which the IC chip 31 are bonded are located at different positions from the second connection portions 41t and 42t in the card thickness direction Dt. In this case, it is preferred to set the lengths of the slits 48A and 48B so that the lines L3 do not interfere with the IC chip 31 and are positioned away from the IC chip 31 toward the outer periphery of the circuit board 40E.

Fourth Embodiment of Card-Type Medium

A fourth embodiment of the card-type medium of the present invention will be described below with reference to the drawings.

Figure 19:
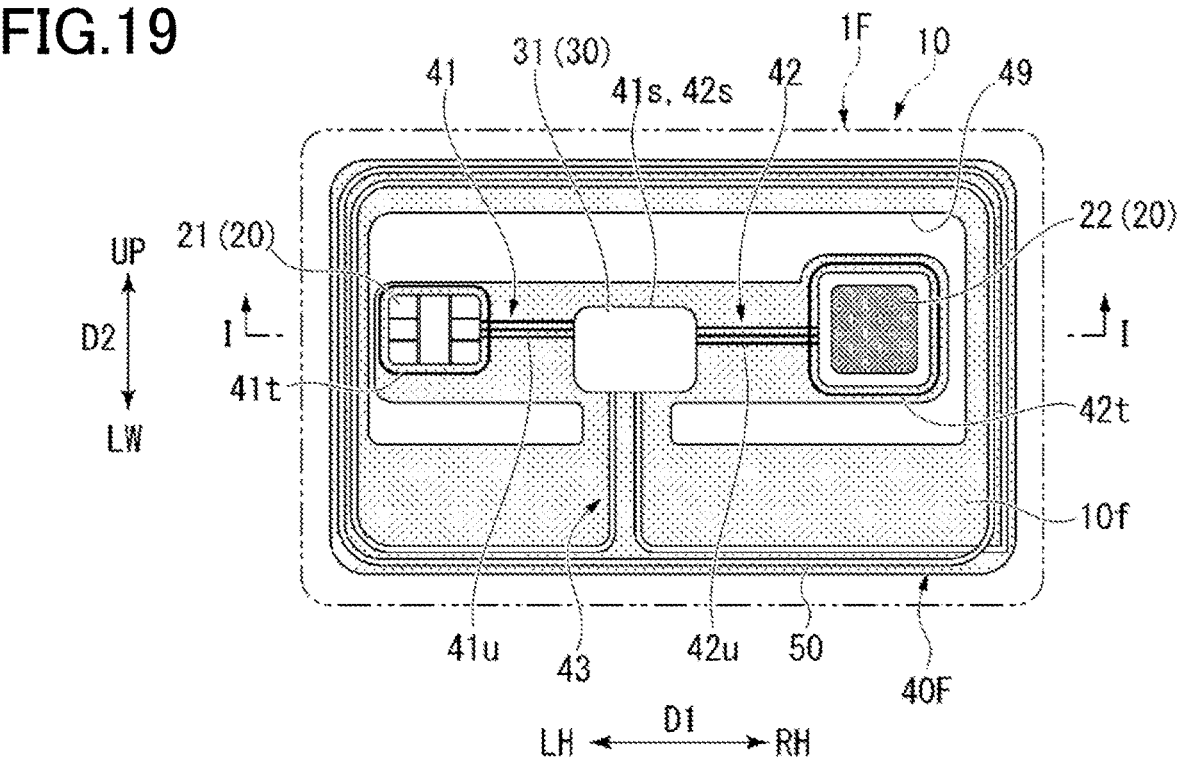
FIG. 19 is a plan view illustrating an exposed component, an internal component and a circuit board provided in an IC card according to a fourth embodiment of the present invention.
Figure 20:
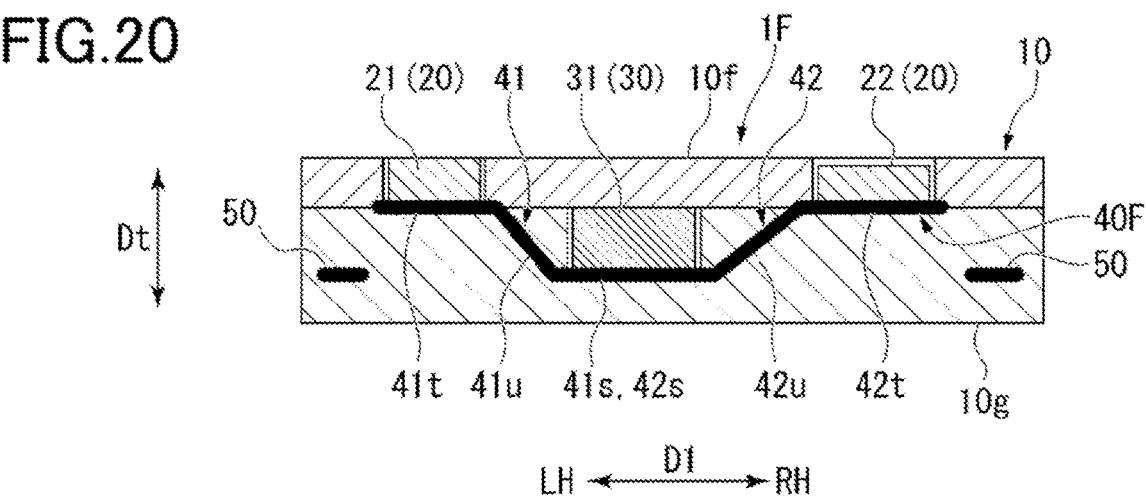
FIG. 20 is a cross-sectional view taken along the line I-I of FIG. 19.

As shown in FIGS. 19 and 20, an IC card 1F includes the card body 10, the internal component 30, the exposed component 20, a circuit board 40F and the antenna 50.

In the IC card 1F, the IC chip 31 is disposed between the contact terminal 21 and the fingerprint sensor 22 in the long side direction D1. The contact terminal wiring portion 41 and the fingerprint sensor wiring portion 42 are located on both sides of the IC chip 31 (first connection portions 41s and 42s) in the long side direction D1. Both the connection wiring portion 41u of the contact terminal wiring portion 41 and the connection wiring portion 42u of the fingerprint sensor wiring portion 42 extend in the long side direction D1.

The circuit board 40F includes a cutout portion 49 cut out along the outer edge of the contact terminal wiring portion 41 and the fingerprint sensor wiring portion 42, including the first connection portions 41s and 42s, the second connection portions 41t and 42t, and the connection wiring portions 41u and 42u. The cutout portion 49 continuously surrounds the contact terminal wiring portion 41 and the fingerprint sensor wiring portion 42, including the first connection portions 41s and 42s, the second connection portions 41t and 42t, and the connection wiring portions 41u and 42u, except for a portion where the antenna wiring portion 43 is connected to the IC chip 31. Accordingly, the contact terminal wiring portion 41 and the fingerprint sensor wiring portion 42 are each formed in a band shape extending in an extending direction of each portion.

In the circuit board 40F, the connection wiring portion 41u of the contact terminal wiring portion 41 extends between the first connection portion 41s and the second connection portion 41t in the extending direction of the connection wiring portion 41u (toward the first side (LH side) in the long side direction D1) while being inclined toward the front surface 10f in the card thickness direction Dt. The connection wiring portion 42u of the fingerprint sensor wiring portion 42 extends between the first connection portion 42s and the second connection portion 42t in the extending direction of the connection wiring portion 42u (toward the second side (RH side) in the long side direction D1) while being inclined toward the front surface 10f in the card thickness direction Dt.

In the IC card 1F of the present embodiment, the internal component 30 is located at a different position in the card thickness direction Dt from the exposed components 20. The first connection portions 41s and 42s to which the internal component 30 is bonded are located at different positions in the card thickness direction Dt from the second connection portions 41t and 42t to which the exposed components 20 are respectively bonded. The connection wiring portions 41u and 42u that connect the first connection portions 41s and 42s and the second connection portions 41t and 42t to each other, respectively, extend in a direction including the card thickness direction Dt. Accordingly, the internal component 30 can be directly connected to the first connection portions 41s and 42s, and the exposed components 20 can be directly connected to the second connection portions 41t and 42t, respectively, without using a spacer. Therefore, it is possible to provide an IC card 1F capable of preventing an increase in time, effort and cost of manufacturing, and reducing the risk of occurrence of connection failure.

According to the IC card 1F of the present embodiment, the circuit board 40F includes the cutout portion 49 cut out along outside the outer edge of the contact terminal wiring portion 41 and the fingerprint sensor wiring portion 42, including the first connection portions 41s and 42s, the second connection portions 41t and 42t, and the connection wiring portions 41u and 42u. Accordingly, the contact terminal wiring portion 41 and the fingerprint sensor wiring portion 42 are each formed in a band shape extending in an extending direction of each portion. Therefore, it becomes easy to arrange the connection wiring portions 41u and 42u so that they extend in a direction including the card thickness direction Dt.

Modified Example of First to Fourth Embodiments of Card-Type Medium

Figure 21:
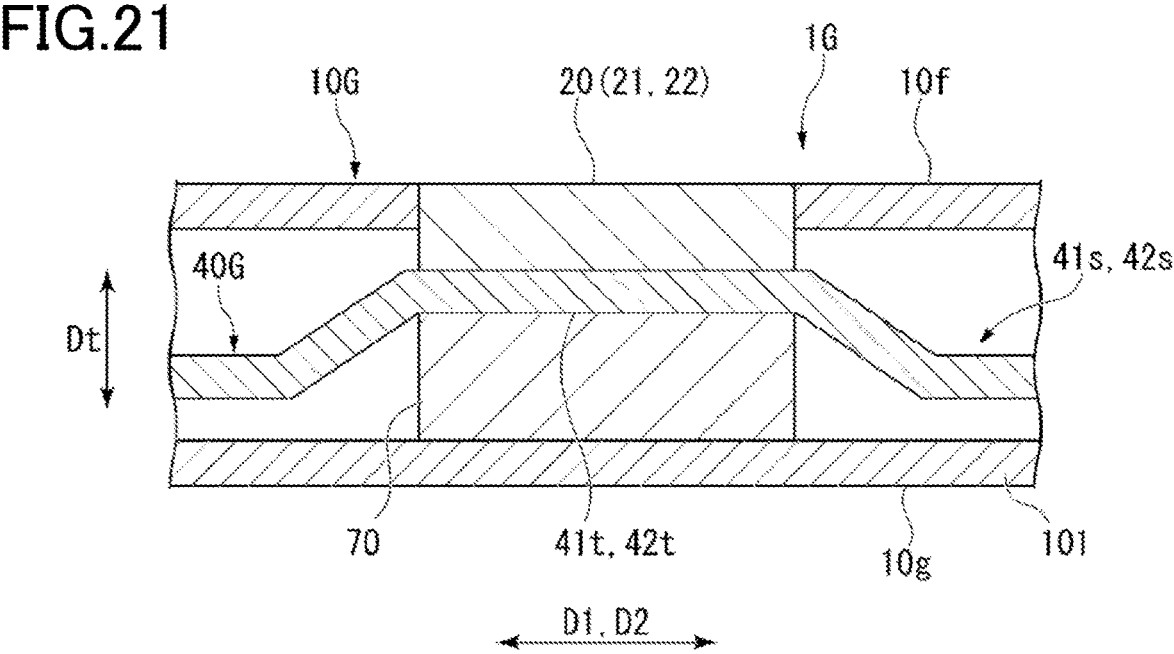
FIG. 21 is a cross-sectional view of an IC card according to a modified example of the first to fourth embodiments of the present invention.

In the above embodiments, the first connection portions 41s and 42s to which the internal component 30 is bonded are located at different positions in the card thickness direction Dt from the second connection portions 41t and 42t to which the exposed components 20 are respectively bonded. In this configuration, as shown in FIG. 21, each of the exposed components 20 of an IC card 1G may be supported by a spacer 70 provided on the card substrate 101 constituting the rear surface 10g of a card body 10G.

The spacer 70 is located on the opposite side of the second connection portions 41t and 42t of the contact terminal wiring portion 41 and the fingerprint sensor wiring portion 42, to which the exposed components 20 (contact terminal 21 and fingerprint sensor 22) are respectively bonded, to the exposed components 20 in the card thickness direction Dt.

Accordingly, the second connection portions 41t and 42t of the contact terminal wiring portion 41 and the fingerprint sensor wiring portion 42 of a circuit board 40G are directly bonded to the contact terminal 21 and the fingerprint sensor 22, respectively. Therefore, it is possible to provide an IC card 1G capable of preventing an increase in time, effort and cost of manufacturing, and reducing the risk of occurrence of connection failure. Further, due to the spacer 70 supporting the exposed component 20, the exposed component 20 can be stably supported during the manufacturing process.

Other Modified Examples of First to Fourth Embodiments of Card-Type Medium

Figure 22:
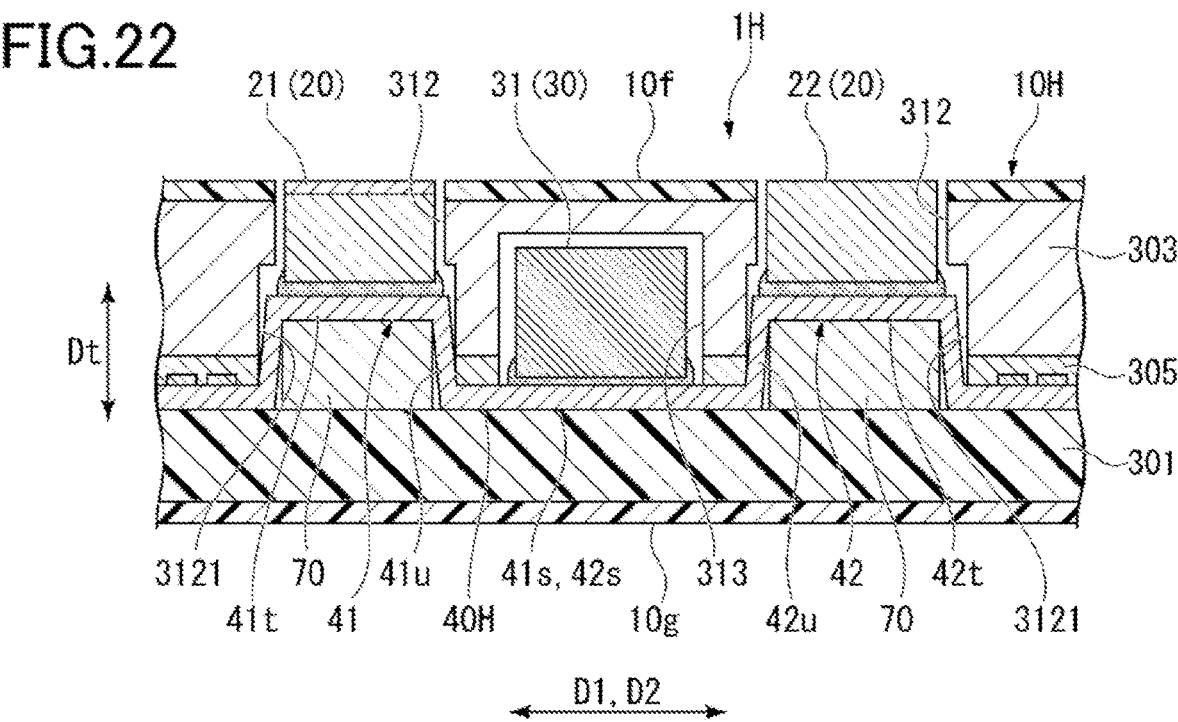
FIG. 22 is a cross-sectional view of an IC card according to another modified example of the first to fourth embodiments of the present invention.

As shown in FIG. 22, in a card body 10H of an IC card 1H, a card substrate 303 disposed on a front surface 10f side may be made of metal, for example.

The card body 10H is configured by laminating a plurality of sheet-shaped card substrates 301 and 303 in the card thickness direction Dt. The card substrate 303 disposed on a front surface 10f side of the card body 10H has apertures 312 that accommodate the contact terminal 21 and the fingerprint sensor 22, respectively. On a surface of the card substrate 303 facing the rear surface 10g, a recess 313 that is recessed toward the front surface 10f in the card thickness direction Dt is formed. The recess 313 accommodates the IC chip 31.

The card substrate 301 disposed on a rear surface 10g side of the card body 10H may be made of a resin, for example. A circuit board 40H is disposed between the card substrate 301 and the card substrate 303. The card substrate 301 and the card substrate 303 are bonded to each other via a bonding layer 305 made of a ferrite layer or the like.

Each of the exposed components 20 of the IC card 1H is supported by the spacer 70 provided on the card substrate 301 constituting the rear surface 10g of the card body 10H. The spacer 70 is located on the opposite side of the second connection portions 41t and 42t of the contact terminal wiring portion 41 and the fingerprint sensor wiring portion 42, to which the exposed components 20 (contact terminal 21 and fingerprint sensor 22) are respectively bonded, to the exposed components 20 in the card thickness direction Dt.

In the circuit board 40H, the connection wiring portion 41u of the contact terminal wiring portion 41 extends between the first connection portion 41s and the second connection portion 41t in the extending direction of the connection wiring portion 41u (long side direction D1) while being inclined relative to the card thickness direction Dt. The connection wiring portion 42u of the fingerprint sensor wiring portion 42 extends between the first connection portion 42s and the second connection portion 42t in the extending direction of the connection wiring portion 42u (long side direction D1) while being inclined relative to the card thickness direction Dt.

The aperture 312 formed in the card substrate 303 has an enlarged diameter portion 3121 on the rear surface 10g side in the card thickness direction Dt. The enlarged diameter portion 3121 has an aperture size in a direction perpendicular to the card thickness direction Dt (long side direction D1 or short side direction D2) larger than an aperture size on the front surface 10f of the aperture 312. The connection wiring portions 41u and 42u extending between the first connection portions 41s and 42s and the second connection portions 41t and 42t, respectively, in a direction including the card thickness direction Dt, are accommodated between the spacer 70 and an inner wall of the enlarged diameter portion 3121.

Accordingly, the second connection portions 41t and 42t of the contact terminal wiring portion 41 and the fingerprint sensor wiring portion 42 are directly bonded to the contact terminal 21 and the fingerprint sensor 22, respectively. Therefore, it is possible to provide an IC card 1H capable of preventing an increase in time, effort and cost of manufacturing, and reducing the risk of occurrence of connection failure.

Fifth Embodiment of Card-Type Medium

With reference to FIGS. 23 to 30, an IC card according to a fifth embodiment of the present invention will be described.

Figure 23:
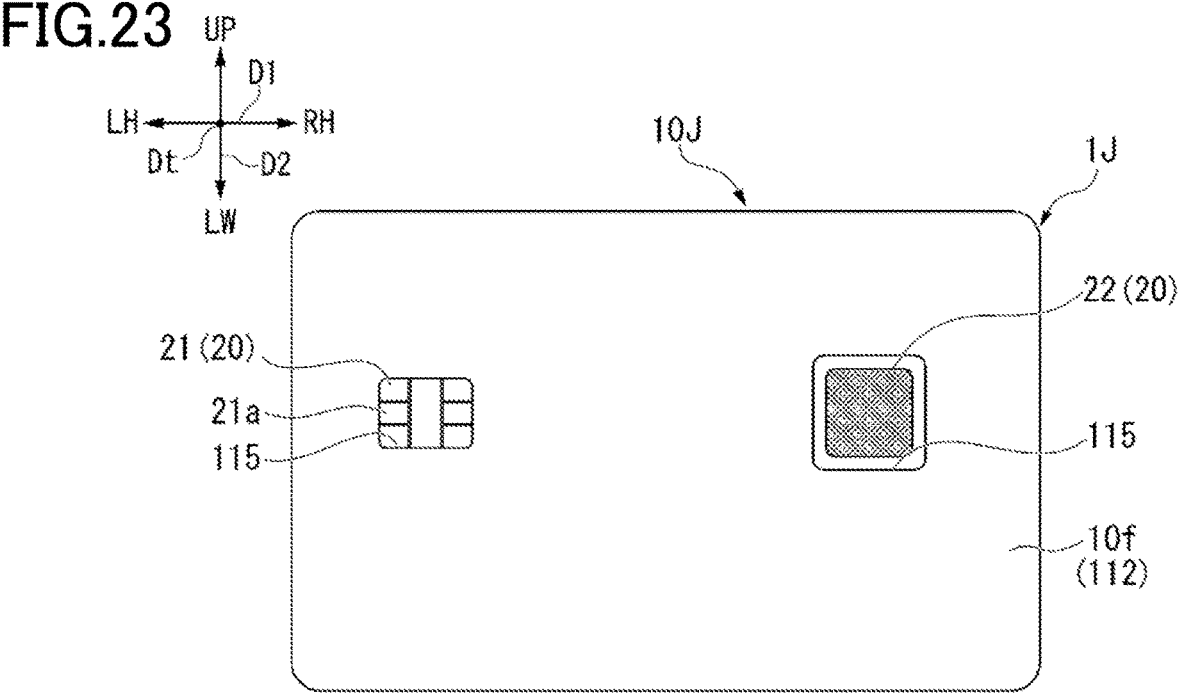
FIG. 23 is an external view of an IC card according to a fifth embodiment of the present invention as seen from the front.
Figure 24:
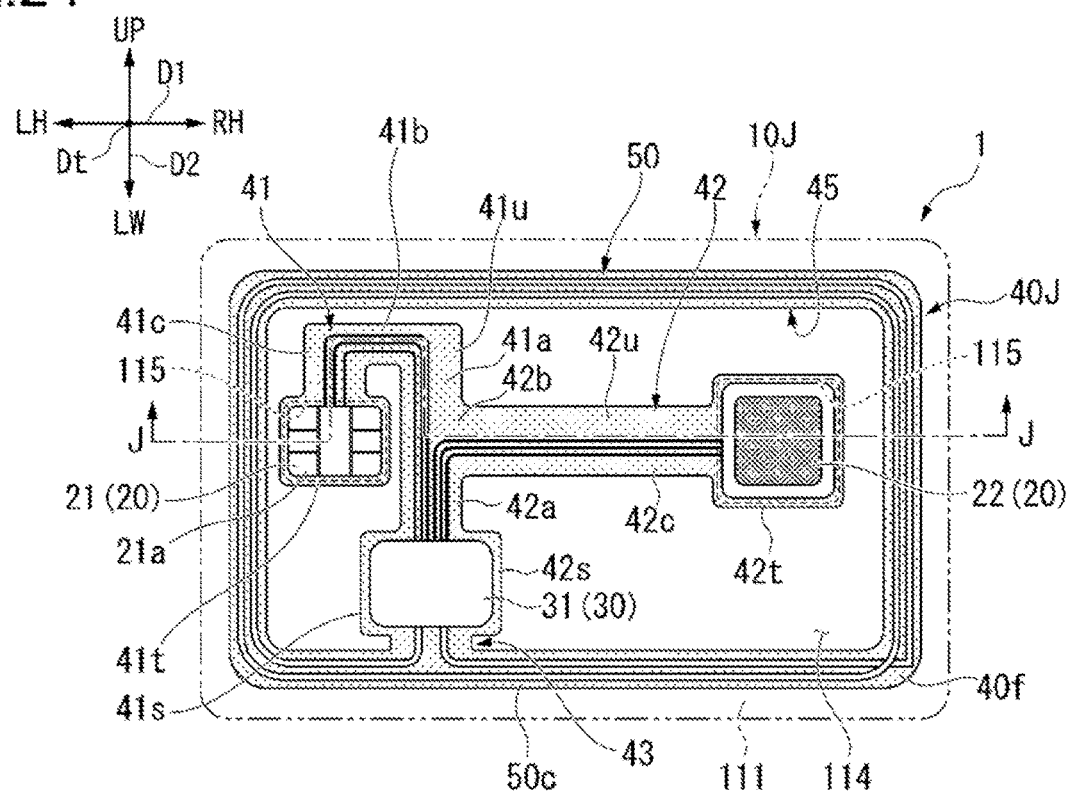
FIG. 24 is a plan view illustrating components and a circuit board provided on the IC card of FIG. 23.
Figure 25:
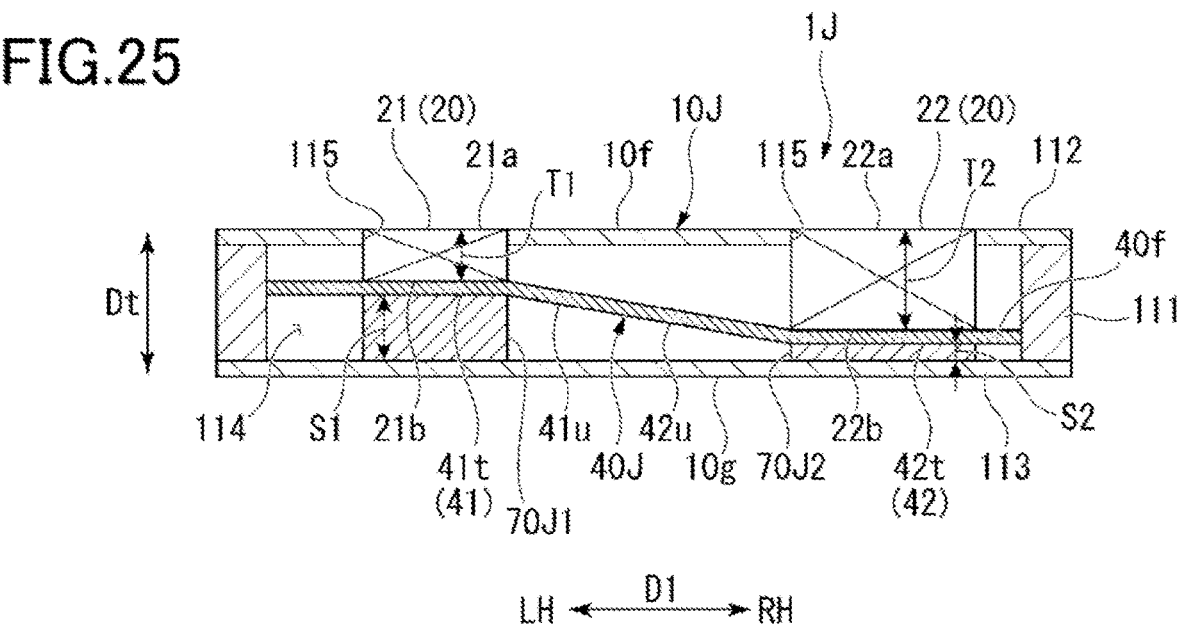
FIG. 25 is a cross-sectional view taken along the line J-J of FIG. 24.

FIG. 23 is an external view of an IC card according to the present embodiment as seen from the front. FIG. 24 is a plan view illustrating components and a circuit board provided on the IC card of FIG. 23. FIG. 25 is a cross-sectional view taken along the line J-J of FIG. 24.

As shown in FIGS. 23 to 25, an IC card (card-type medium) 1J is a dual interface IC card including the contact terminal 21 as a contact interface and the antenna 50 as a contactless interface. Further, the IC card 1J has a biometric authentication function using the fingerprint sensor 22. The IC card 1J includes a card body 10J, the internal component 30, the exposed component 20, a circuit board 40J and the antenna 50.

The card body 10J is plate-shaped and formed in a rectangular shape as viewed in the card thickness direction Dt perpendicular to the front surface 10f of the card body 10J. The card thickness direction Dt herein is a direction penetrating the card body 10J from the front surface 10f to the rear surface 10g. The card body 10J may have a thickness of, for example, approximately 0.5 mm to 1.0 mm in the card thickness direction Dt (for example, when the IC card 1J is a credit card, the card body 10J has a thickness of 0.76 mm).

As shown in FIG. 25, the card body 10J includes a frame member 111, a front surface member 112 and a rear surface member 113.

The frame member 111 is formed in a frame shape extending along the outer edge of the card body 10J. Inside the frame member 111 is a space 114. The frame member 111 has a predetermined thickness in the card thickness direction Dt. The space 114 inside the frame member 111 accommodates the internal component 30 (see FIG. 24), the exposed components 20 and the circuit board 40J. The frame member 111 may be made of, for example, a polyester-based material such as amorphous polyester, a vinyl chloride-based material such as PVC (polyvinyl chloride), a polycarbonate-based material, or an insulating plastic substrate such as PET-G (polyethylene terephthalate copolymer).

The front surface member 112 constitutes the front surface 10f of the card body 10J. The front surface member 112 closes the space 114 inside the frame member 111 by covering the front surface 10f side of the frame member 111 in the card thickness direction Dt. The front surface member 112 has apertures 115 that accommodate the contact terminal 21 and the fingerprint sensor 22, which will be described later. The rear surface member 113 constitutes the rear surface 10g of the card body 10J. The rear surface member 113 closes the space 114 inside the frame member 111 by covering the rear surface 10g side in the card thickness direction Dt of the frame member 111. The front surface member 112 and the rear surface member 113 are sheet materials made of, for example, resin materials such as polyvinyl chloride (PVC) and polyurethane (PU), metal materials such as an aluminum alloy and stainless steel, and the like.

As shown in FIGS. 24 and 25, the exposed components 20 are partially exposed on the front surface 10f of the card body 10J. In the present embodiment, the IC card 1J includes the contact terminal (component) 21 and the fingerprint sensor (component) 22 as the exposed components 20. The contact terminal 21 and the fingerprint sensor 22 are exposed through the apertures 115 formed on the front surface member 112 of the card body 10J.

As shown in FIG. 24, the contact terminal 21 has a rectangular shape when viewed in the card thickness direction Dt. The contact terminal 21 has a contact surface 21a configured to be in contact with and electrically coupled to external contact terminals of contact type external devices such as an automatic teller machine. The contact surface 21a of the contact terminal 21 is formed by etching a surface of an insulating substrate such as glass epoxy or polyimide (PI) to form a conductive pattern, and plating it with nickel, palladium, gold, or the like. In the present embodiment, the contact terminal 21 is located offset to a first side (LH side) in a long side direction D1 of the front surface 10f of the card body 10J relative to a center part of the front surface 10f of the card body 10J.

The fingerprint sensor 22 is plate-shaped and has a rectangular shape when viewed in the card thickness direction Dt. The fingerprint sensor 22 has a configuration in which a plurality of electrodes are covered with a protective film. The fingerprint sensor 22 is located offset to a second side (RH side) in the long side direction D1 of the card body 10J relative to the center part of the front surface 10f of the card body 10J.

The internal component 30 is embedded in the card body 10J by being accommodated in the space 114. In the present embodiment, the IC card 1J includes the IC chip 31 as the internal component 30. The IC chip 31 is electrically coupled to the contact terminal 21, the fingerprint sensor 22 and the antenna 50 (described later) via wiring formed on the circuit board 40J. The IC chip 31 is a secure IC microcomputer, and has functions of external communication via the contact terminal 21 and the antenna 50, fingerprint authentication using the fingerprint sensor 22, and the like. A chip with a known configuration having a contact communication function and a contactless communication function can be used as the IC chip 31. The IC chip 31 has a rectangular shape when viewed in the card thickness direction Dt. The IC chip 31 is disposed between the contact terminal 21 and the fingerprint sensor 22 in the long side direction D1. The IC chip 31 is located offset to a first side (LW side) relative to the contact terminal 21 and the fingerprint sensor 22 in the short side direction D2 perpendicular to the long side direction D1 in a plane in which the front surface 10f of the card body 10J extends.

The circuit board 40J is embedded in the card body 10J. When viewed in the card thickness direction Dt, the circuit board 40J is disposed in the space 114 inside the frame member 111 of the card body 10J. The circuit board 40J has a rectangular outer shape when viewed in the card thickness direction Dt. The circuit board 40J may have a thickness of, for example, 15 μm to 50 μm in the card thickness direction Dt.

The circuit board 40J is formed of a flexible circuit board. The circuit board 40J includes a base substrate made of an insulating material such as polyethylene terephthalate (PET), polyethylene naphthalate (PEN), polycarbonate (PC) or polyimide (PI). A predetermined wiring pattern made of a conductive thin film, such as aluminum or copper, formed by etching or the like is disposed on a surface of the base substrate of the circuit board 40J.

In the card thickness direction Dt, the circuit board 40J is located on the rear surface 10g side of the contact terminal 21, the fingerprint sensor 22 and the IC chip 31 in the card body 10J. The contact terminal 21, the fingerprint sensor 22 and the IC chip 31 are mounted on the substrate surface 40f facing the front surface 10f of the card body 10J. The contact terminal 21, the fingerprint sensor 22 and the IC chip 31 are mounted on the substrate surface 40f of the circuit board 40J by soldering, conductive adhesive, thermal pressure welding, or the like.

The antenna 50 extends on the peripheral portion of the circuit board 40J in a rectangular shape when viewed in the card thickness direction Dt. One or multiple turns of the antenna 50 are formed on the peripheral portion of the circuit board 40J. The antenna 50 may be formed, for example, as a part of the wiring pattern formed on the circuit board 40J. Alternatively, the antenna 50 may be formed separately from the circuit board 40J. When the antenna 50 is formed separately from the circuit board 40J, the antenna 50 can be formed by, for example, providing a metal plate, a metal foil or a metal wire formed in a predetermined antenna shape. In this case, the antenna 50 is bonded to the wiring pattern of the circuit board 40J by soldering, welding, pressure welding, or the like.

The circuit board 40J includes the contact terminal wiring portion 41, the fingerprint sensor wiring portion 42 and the antenna wiring portion 43.

The contact terminal wiring portion 41 electrically couples (connects) the IC chip 31 and the contact terminal 21 to each other. The contact terminal wiring portion 41 includes the first connection portion 41s, the second connection portion (component connection portion) 41t, and the connection wiring portion 41u. The first connection portion 41s is bonded to the IC chip 31. The second connection portion 41t is bonded to the contact terminal 21. The connection wiring portion 41u connects the first connection portion 41s and the second connection portion 41t to each other. The connection wiring portion 41u includes a chip-side wiring portion 41a, a turn-back portion 41b and a terminal-side wiring portion 41c. The chip-side wiring portion 41a extends from the first connection portion 41s toward a second side (UP side) in the short side direction D2. When viewed in the card thickness direction Dt, the turn-back portion 41b is turned back in a U-shape on the second side in the short side direction D2 of the circuit board 40J. The terminal-side wiring portion 41c extends from the turn-back portion 41b toward the first side (LW side) in the short side direction D2, and is continuous with the second connection portion 41t.

The fingerprint sensor wiring portion 42 electrically couples the IC chip 31 and the fingerprint sensor 22 to each other. The fingerprint sensor wiring portion 42 includes the first connection portion 42s, the second connection portion (component connection portion) 42t, and the connection wiring portion 42u. The first connection portion 42s is bonded to the IC chip 31. The second connection portion 42t is bonded to the fingerprint sensor 22. The connection wiring portion 42u connects the first connection portion 42s and the second connection portion 42t to each other. The connection wiring portion 42u includes a chip-side wiring portion 42a, a bent portion 42b and a sensor-side wiring portion 42c. The chip-side wiring portion 42a extends, along with the chip-side wiring portion 41a, from the first connection portion 42s toward the second side (UP side) in the short side direction D2. When viewed in the card thickness direction Dt, the bent portion 42b is bent in an L-shape at an intermediate portion in the short side direction D2 of the circuit board 40J. The sensor-side wiring portion 42c extends from the bent portion 42b toward the second side (RH side) in the long side direction D1, and is continuous with the second connection portion 42t.

The antenna wiring portion 43 electrically couples the IC chip 31 and the antenna 50 to each other. The antenna wiring portion 43 is located on the opposite side of the IC chip 31 to the contact terminal wiring portion 41 and the fingerprint sensor wiring portion 42 in the short side direction D2. The antenna wiring portion 43 extends from the IC chip 31 toward the first side in the short side direction D2, and is connected to a long side portion 50a of the antenna 50.

The circuit board 40J includes the cutout portion 45. The cutout portion 45 is an aperture formed by cutting out the circuit board 40J along the outer edge of the contact terminal wiring portion 41, the fingerprint sensor wiring portion 42 and the antenna wiring portion 43. Thus, the contact terminal wiring portion 41, the fingerprint sensor wiring portion 42 and the antenna wiring portion 43 are each formed in a band shape extending in an extending direction of each portion.

As shown in FIG. 25, in the card thickness direction Dt, the contact terminal 21 and the fingerprint sensor 22 are located offset to the front surface 10f of the card body 10J relative to the IC chip 31. The contact surface 21a of the contact terminal 21 and a touch surface 22a of the fingerprint sensor 22 are located at the same position as the front surface 10f of the card body 10J in the card thickness direction Dt. A component thickness T1 of the contact terminal 21 in the card thickness direction Dt and a component thickness T2 of the fingerprint sensor 22 in the card thickness direction Dt are different from each other. In the present embodiment, the component thickness T1 of the contact terminal 21 is smaller than the component thickness T2 of the fingerprint sensor 22. In this configuration, a bonding surface 21b of the contact terminal 21 to which the second connection portion 41t is bonded and a bonding surface 22b of the fingerprint sensor 22 to which the second connection portion 42t is bonded are located at different positions in the card thickness direction Dt. Accordingly, the second connection portion 41t of the contact terminal wiring portion 41 bonded to the bonding surface 21b of the contact terminal 21 and the second connection portion 42t of the fingerprint sensor wiring portion 42 bonded to the bonding surface 22b of the fingerprint sensor 22 are located at different positions in the card thickness direction Dt. The second connection portion 41t is located closer to the front surface 10f of the card body 10J in the card thickness direction Dt than the second connection portion 42t is.

Spacers 70J1 and 70J2 are disposed on the opposite side of the second connection portions 41t and 42t to the contact terminal 21 and the fingerprint sensor 22, respectively. In the present embodiment, the spacers 70J1 and 70J2 are individually provided for the contact terminal 21 and corresponding second connection portion 41t and the fingerprint sensor 22 and corresponding second connection portion 42t, respectively. The spacer 70J1 and the contact terminal 21 are disposed with the second connection portion 41t interposed therebetween. The spacer 70J1 is sandwiched between the second connection portion 41t and the rear surface member 113. The spacer 70J2 and the fingerprint sensor 22 are disposed with the second connection portion 42t interposed therebetween. The spacer 70J2 is sandwiched between the second connection portion 42t and the rear surface member 113. The spacers 70J1 and 70J2 may simply be in contact with the second connection portions 41t and 42t, respectively, or may be bonded to the second connection portions 41t and 42t by adhesion, welding, or the like.

In this configuration, the spacer 70J1 disposed in contact with the second connection portion 41t and the spacer 70J2 disposed in contact with the second connection portion 42t have different thicknesses in the card thickness direction Dt. A spacer thickness S1 of the spacer 70J1 disposed in contact with the second connection portion 41t is larger than a spacer thickness S2 of the spacer 70J2 disposed in contact with the second connection portion 42t.

Thus, the contact terminal 21 and the fingerprint sensor 22 as the exposed components 20 are supported by the spacers 70J1 and 70J2, respectively.

The second connection portion 41t of the contact terminal wiring portion 41 to which the contact terminal 21 is bonded and the second connection portion 42t of the fingerprint sensor wiring portion 42 to which the fingerprint sensor 22 is bonded are mechanically (physically) connected via the connection wiring portions 41u and 42u, respectively. The connection wiring portions 41u and 42u extend between the second connection portion 41t and the second connection portion 42t in the extending direction of the connection wiring portions while being inclined relative to the card thickness direction Dt.

The IC card 1J of the present embodiment includes the card body 10J, the contact terminal 21 and the fingerprint sensor 22 which are at least partially embedded in the card body 10J, the circuit board 40J embedded in the card body 10J, the circuit board 40J having the second connection portions 41t and 42t to which the contact terminal 21 and the fingerprint sensor 22 are bonded, respectively, and the spacers 70J1 and 70J2 embedded in the card body 10J, the spacers 70J1 and 70J2 being located on the opposite side of the second connection portions 41t and 42t to the contact terminal 21 and the fingerprint sensor 22, respectively. With this configuration, the contact terminal 21 and the fingerprint sensor 22 can be directly connected to the second connection portions 41t and 42t, respectively. Therefore, it is possible to provide an IC card 1J capable of preventing an increase in time, effort and cost of manufacturing, and reducing the risk of occurrence of connection failure.

According to the IC card 1J of the present embodiment, the contact terminal 21 and the fingerprint sensor 22 partially exposed on the front surface 10f of the card body 10J can be stably supported by the spacers 70J1 and 70J2, respectively.

The IC card 1J of the present embodiment includes the contact terminal 21 and the fingerprint sensor 22 having different component thicknesses T1 and T2, the second connection portions 41t and 42t to which the contact terminals 21 and the fingerprint sensor 22 are respectively bonded, and the spacers 70J1 and 70J2 disposed in contact with the second connection portions 41t and 42t, the spacers 70J1 and 70J2 having different spacer thicknesses S1 and S2. In this configuration, the spacers 70J1 and 70J2 are individually provided for the contact terminal 21 and the fingerprint sensor 22 having different component thicknesses T1 and T2. Therefore, by providing the spacers 70J1 and 70J2 corresponding to the component thicknesses T1 and T2 of the contact terminal 21 and the fingerprint sensor 22, the contact terminal 21 and the fingerprint sensor 22 having different component thicknesses T1 and T2 can be accurately positioned in the card thickness direction Dt.

The IC card 1J of the present embodiment includes the connection wiring portions 41u and 42u extending between the second connection portions 41t and 42t in a direction including the card thickness direction Dt to connect the second connection portions 41t and 42t. Accordingly, the connection wiring portions 41u and 42u can be appropriately positioned between the second connection portions 41t and 42t located at different positions in the card thickness direction Dt.

Modified Example of Fifth Embodiment of Card-Type Medium

In the embodiments described above, the spacers 70J1 and 70J2 are individually provided for the contact terminal 21 and the fingerprint sensor 22. However, the form of the spacers is not limited thereto.

Figure 26:
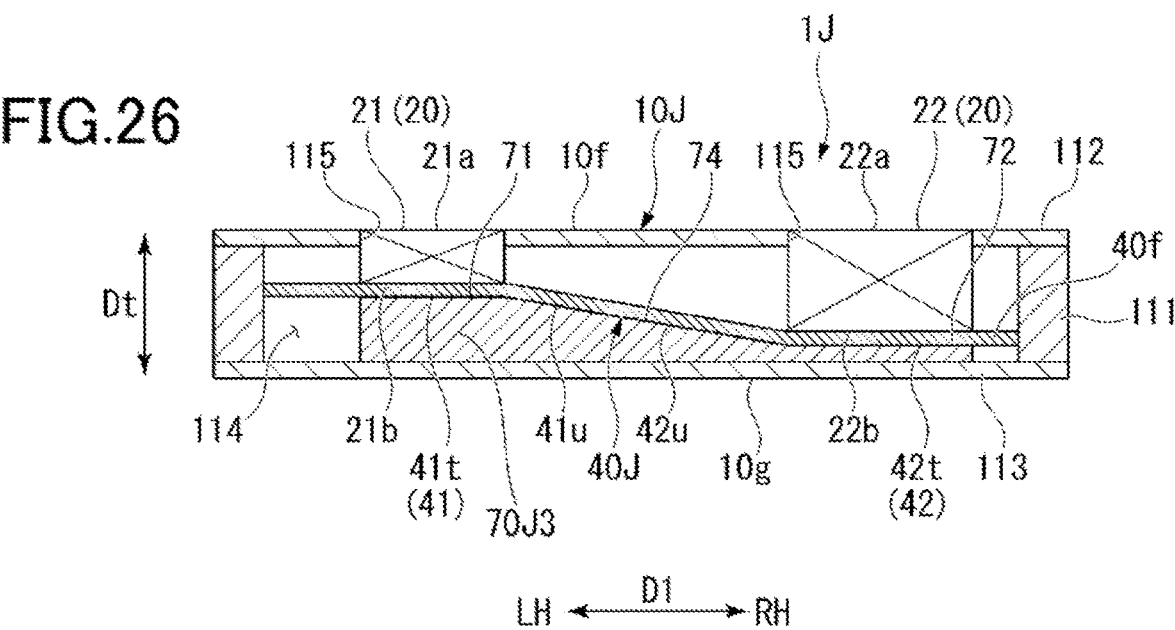
FIG. 26 is a cross-sectional view illustrating a modified example of a spacer provided in an IC card according to the fifth embodiment of the present invention.

For example, as shown in FIG. 26, a single spacer 70J3 may be provided for the contact terminal 21 and the fingerprint sensor 22. The spacer 70J3 extends continuously in a direction perpendicular to the card thickness direction Dt (long side direction D1 or short side direction D2). The spacer 70J includes a plurality of support surfaces 71 and 72 in contact with a plurality of second connection portions 41t and 42t, respectively. The support surface 71 is formed to be in contact with the second connection portion 41t to which the contact terminal 21 is bonded. The support surface 72 is formed to be in contact with the second connection portion 42t to which the fingerprint sensor 22 is bonded. The support surfaces 71 and 72 are located at different positions in the card thickness direction Dt.

The spacer 70J3 includes a slanted surface 74 extending along the connection wiring portions 41u and 42u between the support surfaces 71 and 72.

According to the configuration of the modified example, the number of spacers 70J3 can be reduced, reducing the time and effort in manufacturing. Further, the connection wiring portions 41u and 42u can be stably supported by the slanted surface 74.

Other Modified Examples of Fifth Embodiment of Card-Type Medium

Figure 27:
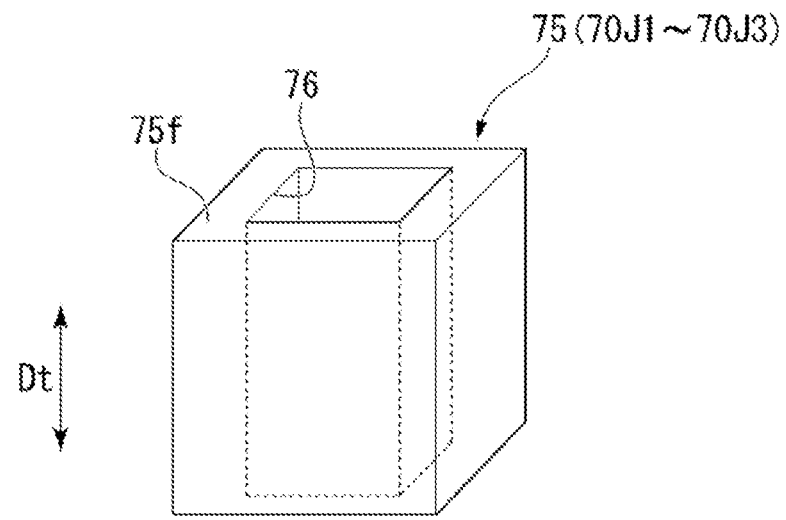
FIG. 27 is a perspective view of a spacer member used for a spacer in a modified example of a fifth embodiment of the present invention.
Figure 28:
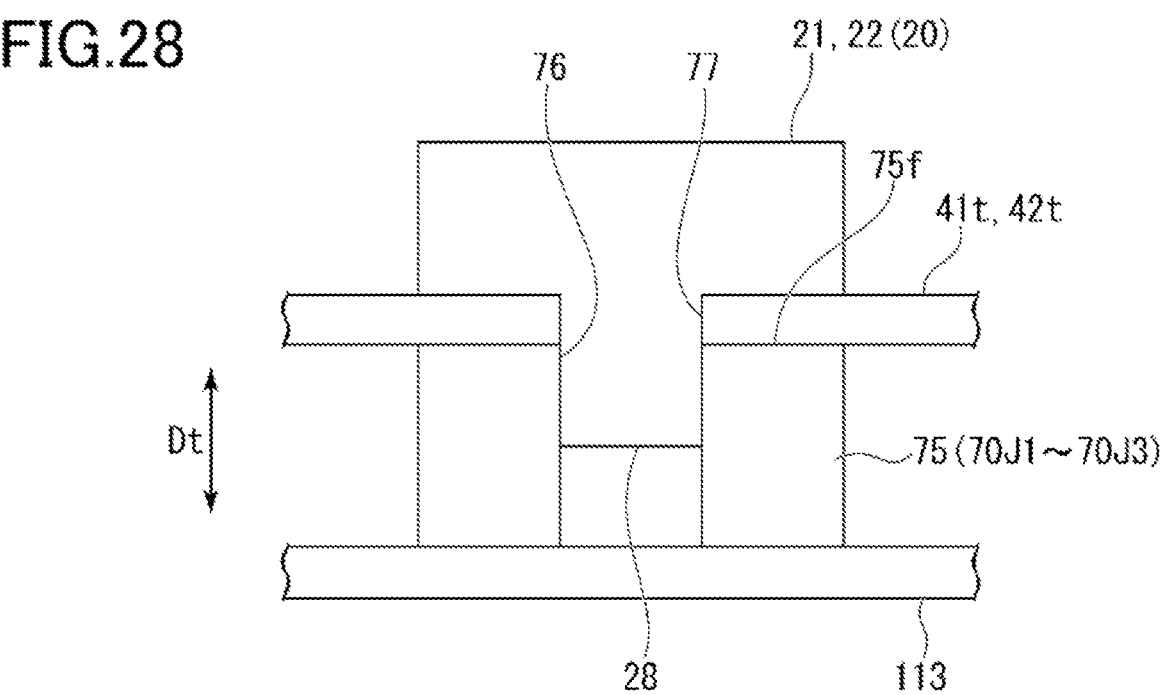
FIG. 28 is a cross-sectional view illustrating a main part of an IC card using the spacer member.

As shown in FIGS. 27 and 28, a spacer member 75 described below, for example, may be used as the spacers 70J1 to 70J3 of the above embodiments and modified examples thereof. The spacer member 75 includes a recess 76 on a support surface 75f in contact with the second connection portions 41t and 42t. The recess 76 is recessed in the card thickness direction Dt from the support surface 75f. When components such as the contact terminal 21 and the fingerprint sensor 22 bonded to the second connection portions 41t and 42t have a projection 28, the projection 28 can be accommodated in the recess 76. In this case, a hole 77 through which the projection 28 is inserted is formed in the second connection portions 41t and 42t.

Figure 29:
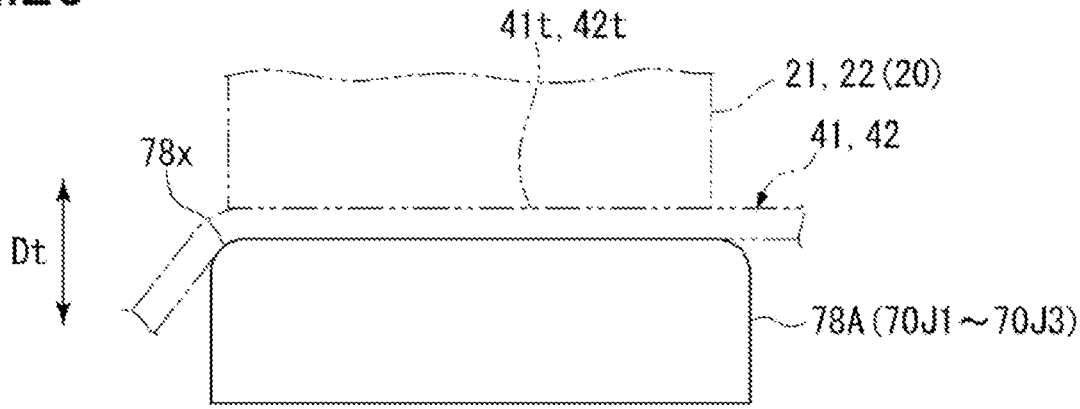
FIG. 29 is a cross-sectional view illustrating another modified example of the spacer member.

As shown in FIG. 29, a spacer member 78A, for example, may be used as the spacers 70J1 to 70J3 described in the above embodiments and modified examples thereof. The spacer member 78A has an outer dimension in a direction perpendicular to the card thickness direction Dt larger than that of each of the contact terminal 21 and the fingerprint sensor 22. The spacer member 78A has a curved surface 78x at the periphery of a surface 78f in contact with the second connection portions 41t and 42t. The curved surface 78x provided on the spacer member 78A can prevent stress from being concentrated on the contact terminal wiring portion 41 and the fingerprint sensor wiring portion 42 when the contact terminal wiring portion 41 and the fingerprint sensor wiring portion 42 in contact with the spacer member 78A are curved or bent in the card thickness direction Dt.

Figure 30:
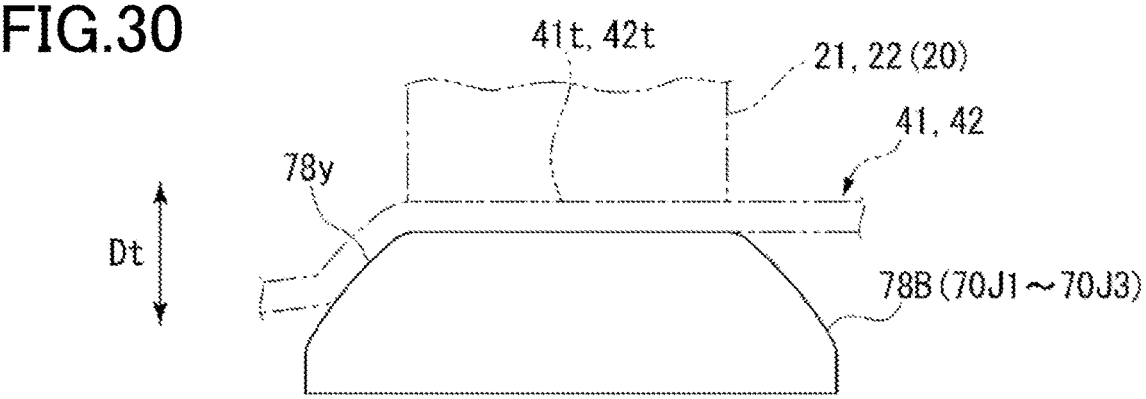
FIG. 30 is a cross-sectional view illustrating still another modified example of the spacer member.

As shown in FIG. 30, a spacer member 78B having a slanted curved surface 78y, instead of the curved surface 78x, at the periphery may be used as the spacers 70J1 to 70J3.

Sixth Embodiment of Card-Type Medium

With reference to FIGS. 31 to 34, an IC card according to a sixth embodiment of the present invention will be described.

Figure 31:
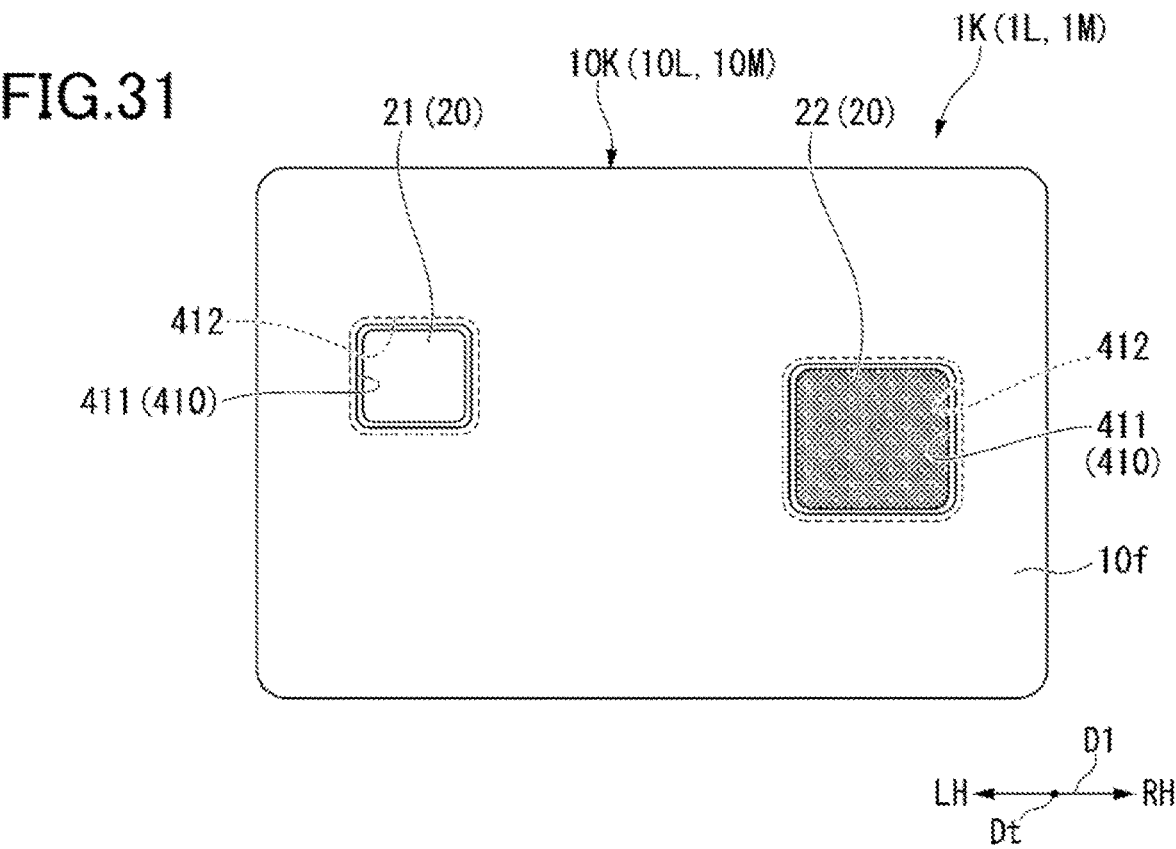
FIG. 31 is an external view of an IC card according to a sixth embodiment of the present invention as seen from the front.
Figure 32:
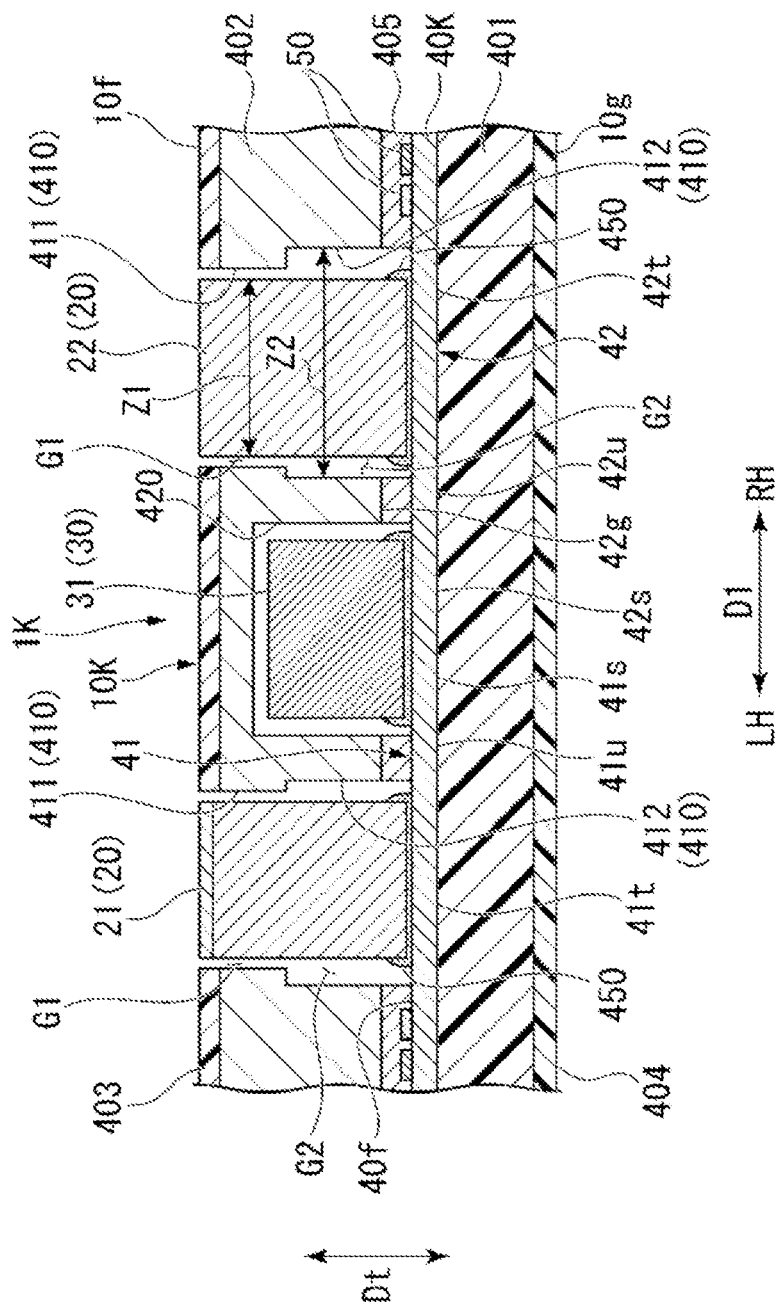
FIG. 32 is a cross-sectional view of an IC card according to the sixth embodiment of the present invention.

FIG. 31 is an external view of an IC card according to the present embodiment as seen from the front. FIG. 32 is a cross-sectional view of an IC card according to the present embodiment.

As shown in FIGS. 31 and 32, an IC card (card-type medium) 1K is a dual interface IC card including the contact terminal 21 as a contact interface and the antenna 50 (see FIG. 32) as a contactless interface. Further, the IC card 1K has a biometric authentication function using the fingerprint sensor 22. The IC card 1K includes a card body 10K, the internal component 30, the exposed components 20, a circuit board 40K and the antenna 50.

The card body 10K is plate-shaped and formed in a rectangular shape as viewed in the card thickness direction Dt (see FIG. 32) perpendicular to the front surface 10f of the card body 10K. The card thickness direction Dt herein is a direction penetrating the card body 10K from the front surface 10f to the rear surface 10g. The card body 10K may have a thickness of, for example, approximately 0.5 mm to 1.0 mm in the card thickness direction Dt (for example, when the IC card 1K is a credit card, the card body 10K has a thickness of 0.76 mm).

As shown in FIG. 32, the card body 10K is configured by laminating a plurality of sheet-shaped card substrates 401 and 402 in the card thickness direction Dt.

The card substrate 402 disposed on a front surface 10f side of the card body 10K has apertures 410 that accommodate the contact terminal 21 and the fingerprint sensor 22, respectively. The apertures 410 penetrates through the card substrate 402 in the card thickness direction Dt.

In the card substrate 402, an internal aperture 420 is formed in a substrate rear surface 42g facing the rear surface 10g in the card thickness direction Dt. The internal aperture 420 is recessed toward the front surface 10f in the card thickness direction Dt from the substrate rear surface 42g. The aperture 420 accommodates the internal component 30 (IC chip 31 described later). The aperture 410 and the internal aperture 420 is formed by laser processing or cutting.

The card substrate 401 disposed on a rear surface 10g side of the card body 10K may be made of, for example, a polyester-based material such as amorphous polyester, a vinyl chloride-based material such as PVC (polyvinyl chloride), a polycarbonate-based material, or an insulating plastic substrate such as PET-G (polyethylene terephthalate copolymer).

The card substrate 402 is made of a conductive metallic material, such as a stainless steel or a titanium alloy. The card substrate 402 may have a thickness of, for example, 100 to 500 µm in the card thickness direction Dt.

Exterior resin layers 403 and 404 are disposed on the front surface 10f and the rear surface 10g of the card body 10K, respectively. The exterior resin layer 403 constituting the front surface 10f covers the card substrate 402 except for the apertures 410. The exterior resin layer 404 constituting the rear surface 10g covers the entire card substrate 401. The exterior resin layers 403 and 404 may be made of, for example, a laminate (film).

The card substrate 401 and the card substrate 402 are integrated by a conversion process such as hot press lamination or adhesive lamination. The card substrate 401 and the card substrate 402 may be integrated by cold press lamination using a two-part curing resin, a room temperature curing resin, or a UV curing resin. Further, a ferrite layer 405 may be disposed between the card substrate 401 and the card substrate 402.

The aperture 410 includes a front side aperture 411 and a rear side aperture 412. The front side aperture 411 is located on the front surface 10f side in the card thickness direction Dt. The rear side aperture 412, continuous with the front side aperture 411, is located on the rear surface 10g side in the card thickness direction Dt. An aperture size Z2 in the plane intersecting the card thickness direction Dt in the rear side aperture 412 is larger than an aperture size Z1 of the front side aperture 411 in the plane perpendicular to the card thickness direction Dt. That is, the rear side aperture 412 is an enlarged diameter portion having an aperture size larger than that of the front side aperture 411.

The exposed components 20 are partially exposed on the front surface 10f of the card body 10K. In the present embodiment, the IC card 1K includes the contact terminal 21 and the fingerprint sensor 22 as the exposed components 20. The contact terminal 21 and the fingerprint sensor 22 are respectively accommodated in the apertures 410 formed on the front surface 10f side of the card body 10K.

The contact terminal 21 has a rectangular shape when viewed in the card thickness direction Dt. The contact terminal 21 is configured to be in contact with and electrically coupled to external contact terminals of contact type external devices such as an automatic teller machine. The contact terminal 21 is formed by etching a surface of an insulating substrate such as glass epoxy or polyimide (PI) to form a conductive pattern, and plating it with nickel, palladium, gold, or the like. In the present embodiment, the contact terminal 21 is located offset to a first side (LH side) in the long side direction D1 of the front surface 10f of the card body 10K relative to a center part of the front surface 10f of the card body 10K.

The fingerprint sensor 22 is plate-shaped and has a rectangular shape when viewed in the card thickness direction Dt. The fingerprint sensor 22 has a configuration in which a plurality of electrodes are covered with a protective film. The fingerprint sensor 22 is located offset to a second side (RH side) in the long side direction D1 of the card body 10K relative to the center part of the front surface 10f of the card body 10K.

The contact terminal 21 and the fingerprint sensor 22 are each bonded to the circuit board 40K by a conductive bonding material 450 such as solder or silver paste. In this configuration, the contact terminal 21 and the fingerprint sensor 22 are disposed with a gap G1 between each of them and an inner wall of the front side aperture 411 of the aperture 410. The contact terminal 21 and the fingerprint sensor 22 are disposed with a gap G2 between each of them and an inner wall of the rear side aperture 412 of the aperture 410. The aperture size Z2 of the rear side aperture 412 is larger than the aperture size Z1 of the front side aperture 411. Accordingly, the gaps G2 from each of the contact terminal 21 and the fingerprint sensor 22 to the inner wall of the rear side aperture 412 are larger than the gaps G1 from each of the contact terminal 21 and the fingerprint sensor 22 to the inner wall of the front side aperture 411. Therefore, even if the conductive bonding material 450 bonding the contact terminal 21 and the fingerprint sensor 22 to the circuit board 40K protrudes outward from a region where each of the contact terminal 21 and the fingerprint sensor 22 is bonded to the circuit board 40K, the conductive bonding material 450 is prevented from contacting the card substrate 402 made of a metal.

The internal component 30 is embedded in the card body 10K. In the present embodiment, the IC card 1K includes the IC chip 31 as the internal component 30. The IC chip 31 is electrically coupled to the contact terminal 21, the fingerprint sensor 22 and the antenna 50 (described later) via wiring formed on the circuit board 40K. The IC chip 31 is a secure IC microcomputer, and has functions of external communication via the contact terminal 21 and the antenna 50, fingerprint authentication using the fingerprint sensor 22, and the like. A chip with a known configuration having a contact communication function and a contactless communication function can be used as the IC chip 31. The IC chip 31 has a rectangular shape when viewed in the card thickness direction Dt.

The circuit board 40K is embedded in the card body 10K. When viewed in the card thickness direction Dt, the circuit board 40K is located inside the outer edge of the card body 10K. The circuit board 40K has a rectangular outer shape when viewed in the card thickness direction Dt. The circuit board 40K may have a thickness of, for example, 15 μm to 50 μm in the card thickness direction Dt.

The circuit board 40K is formed of a flexible circuit board. The circuit board 40K includes a base substrate made of an insulating material such as polyethylene terephthalate (PET), polyethylene naphthalate (PEN), polycarbonate (PC), polyimide (PI) or glass epoxy. A predetermined wiring pattern made of a conductive thin film, such as aluminum or copper, formed by etching or the like is disposed on a surface of the base substrate of the circuit board 40K.

In the card thickness direction Dt, the circuit board 40K is located on the rear surface 10g side of the contact terminal 21, the fingerprint sensor 22 and the IC chip 31 in the card body 10K. The contact terminal 21, the fingerprint sensor 22 and the IC chip 31 are mounted on the substrate surface 40f facing the front surface 10f of the card body 10K.

The antenna 50 extends on the peripheral portion of the circuit board 40K in a rectangular shape when viewed in the card thickness direction Dt. One or multiple turns of the antenna 50 are formed on the peripheral portion of the circuit board 40K. The antenna 50 may be formed, for example, as a part of the wiring pattern formed on the circuit board 40K. Alternatively, the antenna 50 may be formed separately from the circuit board 40K. When the antenna 50 is formed separately from the circuit board 40K, the antenna 50 can be formed by, for example, providing a metal plate, a metal foil or a metal wire formed in a predetermined antenna shape. In this case, the antenna 50 is bonded to the wiring pattern of the circuit board 40K by soldering, welding, pressure welding, or the like.

The circuit board 40K includes the contact terminal wiring portion 41, the fingerprint sensor wiring portion 42 and the antenna wiring portion (not shown). In the present embodiment, the circuit board 40K is disposed on the card substrate 401 located on a rear surface 10g side of the card body 10K in the plane perpendicular to the card thickness direction Dt.

The contact terminal wiring portion 41 electrically couples (connects) the IC chip 31 and the contact terminal 21 to each other. The contact terminal wiring portion 41 includes the first connection portion 41s, the second connection portion 41t, and the connection wiring portion 41u. The first connection portion 41s is bonded to the IC chip 31. The second connection portion 41t is bonded to the contact terminal 21. The connection wiring portion 41u connects the first connection portion 41s and the second connection portion 41t to each other.

The fingerprint sensor wiring portion 42 electrically couples the IC chip 31 and the fingerprint sensor 22 to each other. The fingerprint sensor wiring portion 42 includes the first connection portion 42s, the second connection portion 42t, and the connection wiring portion 42u. The first connection portion 42s is bonded to the IC chip 31. The second connection portion 42t is bonded to the fingerprint sensor 22. The connection wiring portion 42u connects the first connection portion 42s and the second connection portion 42t to each other.

The antenna wiring portion (not shown) electrically couples the IC chip 31 and the antenna 50 to each other.

In the IC card 1K of the present embodiment, the aperture 410 formed in the card body 10K includes the front side aperture 411 located on the front surface 10f side in the card thickness direction Dt, and the rear side aperture 412 continuous with the front side aperture 411 and located on the rear surface 10g side in the card thickness direction Dt. The rear side aperture 412 has an aperture size in the plane perpendicular to the card thickness direction Dt larger than that of the front side aperture 411. Therefore, the gap G2 is formed between the exposed component 20 accommodated in the aperture 410 and the inner wall of the aperture 410. With this configuration, even when a metal material is used for the card body 10K, an electrical short circuit is prevented from occurring between the card body 10K and the exposed component 20 mounted on the card body 10K.

First Modified Example of Sixth Embodiment of Card-Type Medium

In the sixth embodiment described above, the contact terminal 21 and the fingerprint sensor 22 are directly bonded to the second connection portions 41t and 42t of the circuit board 40K, respectively. However, the bonding manner of the contact terminal 21 and the fingerprint sensor 22 is not limited thereto.

Figure 33:
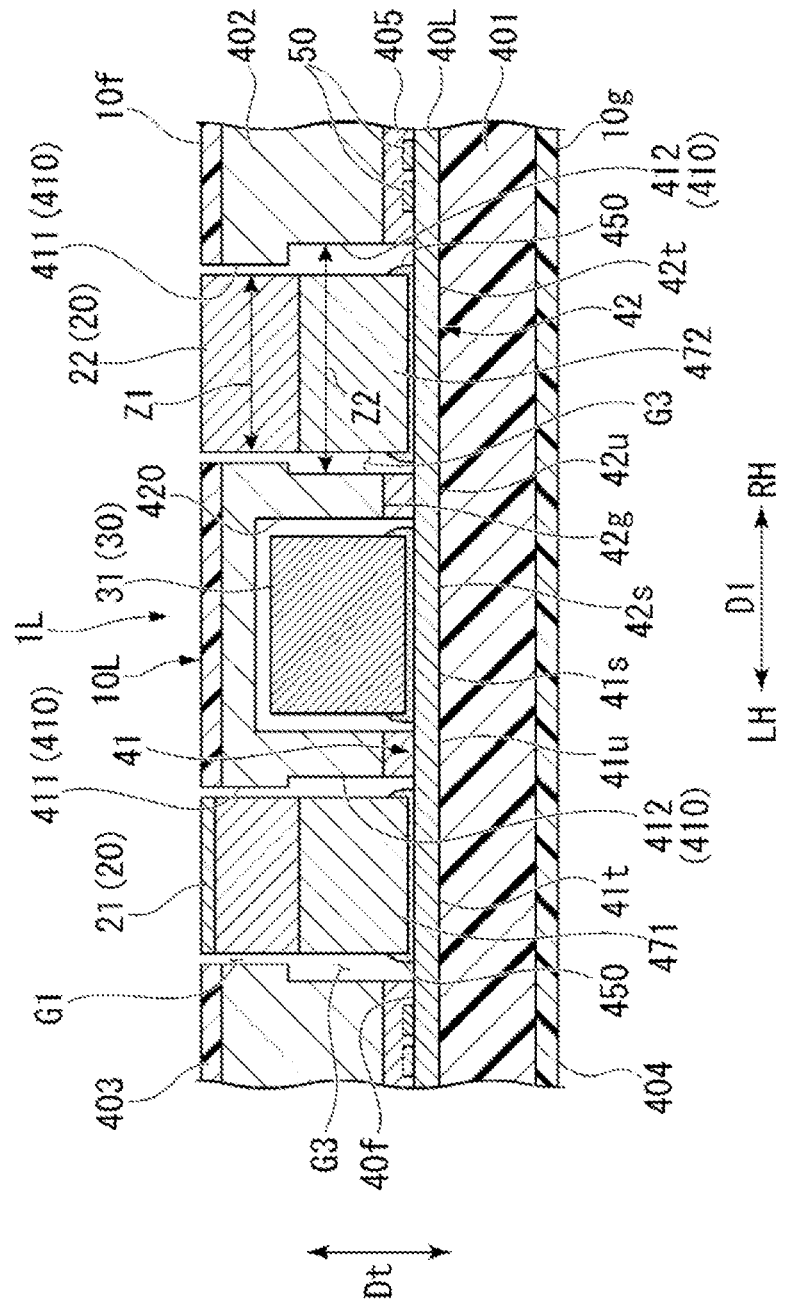
FIG. 33 is a cross-sectional view of an IC card according to a first modified example of the sixth embodiment of the present invention.

For example, as shown in FIG. 33 illustrating an IC card 1L, the contact terminal 21 and the fingerprint sensor 22 may be bonded to the second connection portions 41t and 42t of a circuit board 40L via intermediate spacers 471 and 472, respectively. The intermediate spacers 471 and 472 are sandwiched between the respective exposed components 20 and the circuit board 40L. The intermediate spacers 471 and 472 are accommodated in the rear side apertures 412 of the apertures 410 formed in the card body 10L.

In the intermediate spacers 471 and 472, connection electrodes (not shown) made of a copper foil or the like are formed on both sides of the insulating base substrate such as glass epoxy. The connection electrodes on both sides of the intermediate spacers 471 and 472 are electrically connected to each other by through holes or vias formed by copper plating or the like. The intermediate spacers 471 and 472 are electrically connected to the second connection portions 41t and 42t of the circuit board 40L, and the contact terminal 21 and the fingerprint sensor 22, respectively.

With such intermediate spacers 471 and 472, the contact terminal 21 and the fingerprint sensor 22 can be positioned at the same level in the card thickness direction Dt by varying the height of the intermediate spacers 471 and 472, even when the contact terminal 21 and the fingerprint sensor 22 have different component thicknesses in the card thickness direction Dt.

According to the above IC card 1L, the rear side aperture 412 has an aperture size in the plane perpendicular to the card thickness direction Dt larger than that of the front side aperture 411. Accordingly, a gap G3 is formed between the intermediate spacer 471 accommodated in the aperture 410 and the inner wall of the rear side aperture 412. With this configuration, even when a metal material is used for the card body 10L, an electrical short circuit is prevented from occurring between the card body 10L and the exposed component 20 mounted on the card body 10L.

Second Modified Example of Sixth Embodiment of Card-Type Medium

In the sixth embodiment and the first modified example thereof, the circuit boards 40K and 40L are disposed on the card substrate 401 in the plane perpendicular to the card thickness direction Dt. However, the form of the circuit board is not limited thereto.

Figure 34:
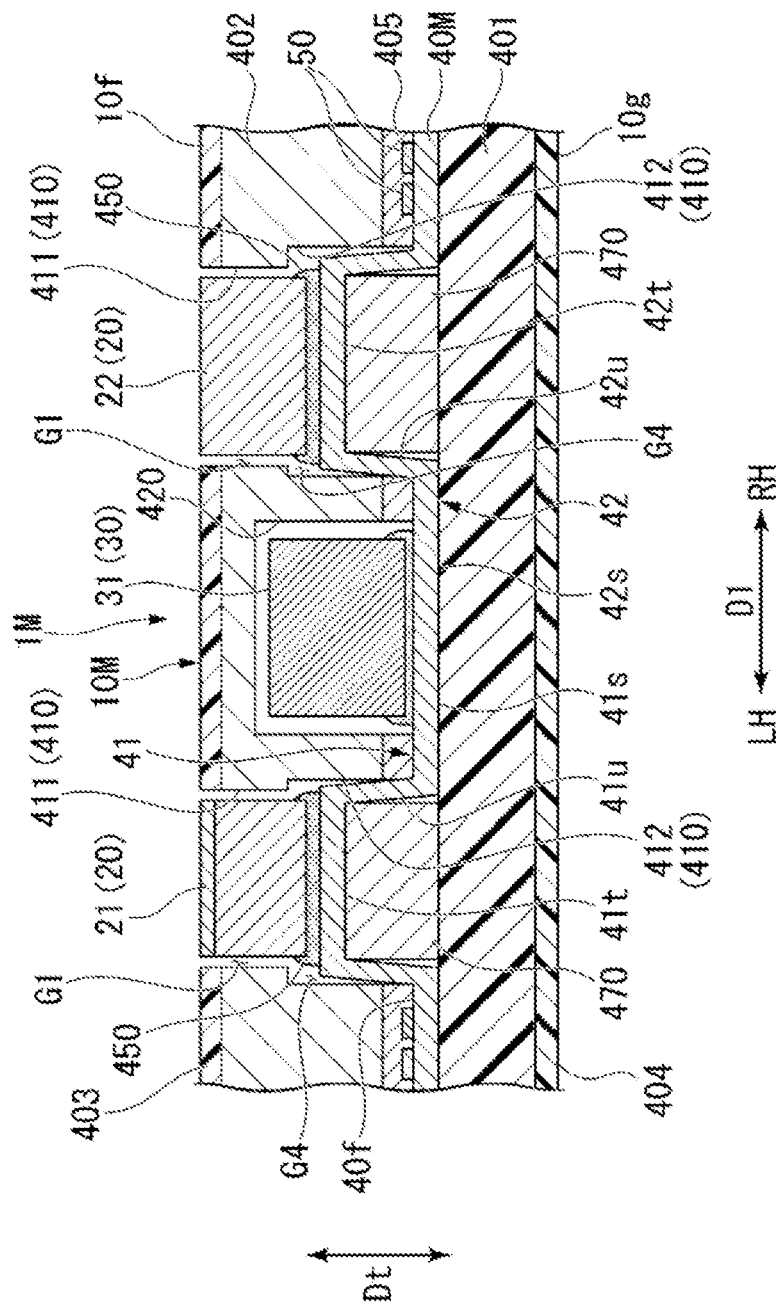
FIG. 34 is a cross-sectional view of an IC card according to a second modified example of the sixth embodiment of the present invention.

For example, as shown in FIG. 34 illustrating an IC card 1M, in the circuit board 40M, the first connection portion 41s of the contact terminal wiring portion 41 and the first connection portion 42s of the fingerprint sensor wiring portion 42 may be located at different positions from the second connection portions (component connection portions) 41t and 42t in the card thickness direction Dt.

Each of the exposed components 20 of the IC card 1M is supported by a spacer 470 provided on the card substrate 401 constituting the rear surface 10g of the card body 10M. The spacer 470 is located on the opposite side of the second connection portions 41t and 42t of the contact terminal wiring portion 41 and the fingerprint sensor wiring portion 42 to which the exposed components 20 (contact terminal 21 and fingerprint sensor 22) are respectively bonded to the exposed components 20 in the card thickness direction Dt.

In the circuit board 40M, the connection wiring portion 41u of the contact terminal wiring portion 41 extends between the first connection portion 41s and the second connection portion 41t in the extending direction of the connection wiring portion 41u while being inclined relative to the card thickness direction Dt. The connection wiring portion 42u of the fingerprint sensor wiring portion 42 extends between the first connection portion 42s and the second connection portion 42t in the extending direction of the connection wiring portion 42u while being inclined relative to the card thickness direction Dt. The connection wiring portions 41u and 42u may extend in the card thickness direction Dt.

The aperture 410 formed in the card substrate 401 has a rear side aperture 412 on the rear surface 10g side in the card thickness direction Dt. Each of the connection wiring portions 41u and 42u is extends between the spacer 470 and the inner wall of the rear side aperture 412. The connection wiring portions 41u and 42u are disposed inside the rear side aperture 412 with a gap G4 between each of them and the inner wall of the rear side aperture 412.

According to the above IC card 1M, the rear side aperture 412 has an aperture size in the plane perpendicular to the card thickness direction Dt larger than that of the front side aperture 411. Therefore, the gap G4 can also be formed between the spacer 470 accommodated in the aperture 410 and the inner wall of the aperture 410. With this configuration, even when a metal material is used for the card body 10M, an electrical short circuit is prevented from occurring between the card body 10M and the exposed component 20 mounted on the card body 10M.

Although some embodiments of the present invention are described in detail with reference to the drawings, specific configurations are not limited to these embodiments. Various modifications and combinations of the configurations can be made without departing from the spirit of the present invention.

For example, the components mounted as the internal component 30 and the exposed component 20 are not limited to the IC chip 31, the contact terminal 21 and the fingerprint sensor 22. Other components may also be mounted as appropriate. Further, in the embodiments described above, the contact terminal 21 and the fingerprint sensor 22 are provided as two types of (two) exposed components 20, but these are merely examples. The type and number of the exposed component 20 and the internal component 30 can be changed as appropriate.

In addition, although the second connection portions 41t and 42t are disposed at different positions from the first connection portions 41s and 42s in the card thickness direction Dt, the positions the plurality of second connection portions in the card thickness direction Dt may also be different from each other.

Although the IC cards 1 and 1B to 1M used as credit cards are illustrated as the card-type media, the form and application of the card-type media are not limited in any manner.

REFERENCE SIGNS LIST 1, 1B, 1C, 1D, 1E, 1F, 1G, 1H, 1J, 1K, 1L, 1M . . . IC card (card-type medium); 10, 10G, 10H, 10J, 10K, 10L, 10M . . . Card body; 10*f* . . . Front surface; 10*g* . . . Rear surface; 12, 312, 410 . . . Aperture; 20 . . . Exposed component; 21 . . . Contact Terminal (component); 22 . . . Fingerprint sensor (component); 30 . . . Internal component; 31 . . . IC chip; 40, 40B, 40C, 40D, 40E, 40F, 40G, 40H, 40J, 40K, 40L, 40M . . . Circuit board; 41*a* . . . Chip-side wiring portion (first inclined portion); 41*c* . . . Terminal-side wiring portion (second inclined portion); 41*s*, 42*s* . . . First connection portion; 41*t*, 42*t* . . . Second connection portion (component connection portion); 41*u*, 42*u* . . . Connection wiring portion; 45, 49 . . . Cutout portion; 46, 47, 48A, 48B . . . Slit; 50 . . . Antenna; D2 . . . Short side direction; Dt . . . Card thickness direction; C1 . . . First direction; C2 . . . Second direction; 70J1, 70J2, 70J3, 470 . . . Spacer; 71, 72 . . . Support surface; 75*f* . . . Support surface; S1, S2 . . . Spacer thickness; T1, T2 . . . Component thickness; 471, 472 . . . Intermediate spacer; G1, G2, G3, G4 . . . Gap; Z1, Z2 . . . Aperture size.

What is claimed is:

1. A card-type medium, comprising:
a card body;
an internal component embedded in the card body;
an exposed component partially exposed on a front surface of the card body; and
a circuit board to which the internal component and the exposed component are bonded, wherein
the circuit board includes
   a first connection portion to which the internal component is bonded,
   a second connection portion to which the exposed component is bonded, the second connection portion being located at a position different from the first connection portion in a card thickness direction connecting the front surface of the card body and a rear surface on an opposite side of the card body to the front surface, and
   a connection wiring portion that connects the first connection portion and the second connection portion, the connection wiring portion extending in a direction including the card thickness direction, wherein
the circuit board includes a slit formed around the connection wiring portion and one of the first connection portion and the second connection portion and wherein
   (a) the slit extends continuously in an extending direction of the connection wiring portion on both sides of the connection wiring portion or (b) the slit extends surrounding one of the first connection portion and the second connection portion, except for a portion where the connection wiring portion is connected to one of the first connection portion and the second connection portion.

2. The card-type medium of claim 1, wherein
the circuit board further includes a cutout portion cut out along an outer edge or outside the outer edge of the first connection portion, the second connection portion and the connection wiring portion.

3. The card-type medium of claim 1, wherein
the slit extends continuously in the extending direction of the connection wiring portion on both sides of the connection wiring portion.

4. The card-type medium of claim 1, wherein
the slit extends surrounding one of the first connection portion and the second connection portion, except for the portion where the connection wiring portion is connected to one of the first connection portion and the second connection portion.

5. The card-type medium of claim 1, wherein
the connection wiring portion extends along the extending direction of the connection wiring portion while being inclined relative to the card thickness direction.

6. The card-type medium of claim 5, wherein
the connection wiring portion includes
   a first inclined portion extending in a first direction which is inclined relative to the card thickness direction, and
   a second inclined portion extending in a second direction which is inclined relative to the card thickness direction, the first direction and the second direction being directions different from each other.

7. The card-type medium of claim 1, wherein
the internal component and the first connection portion are located on a first side in a direction of the front surface of the card body,
the exposed component and the second connection portion are located on a second side in the direction, and
the connection wiring portion extends in the direction between the first side and the second side of the direction while the circuit board is bent between the first side and the second side of the direction.

8. The card-type medium of claim 1, wherein
the card body includes an aperture on the front surface, the aperture accommodating the exposed component, and
the second connection portion covers the entire aperture accommodating the exposed component from a rear surface side in the card thickness direction.

9. The card-type medium of claim 1, wherein
the circuit board includes an antenna extending on a peripheral portion of the card body, and
the exposed component and the internal component are located inside the antenna.

10. The card-type medium of claim 9, wherein
one of the first connection portion and the second connection portion is located at the same position as the antenna in the thickness direction.

11. The card-type medium of claim 9, wherein
the exposed component includes
   a contact terminal configured to be in contact with a contact type external device, and
   a fingerprint sensor configured to detect a fingerprint of a user, and
the internal component includes an IC chip having a contact communication function and a contactless communication function.

12. A card-type medium, comprising:
a card body;
an internal component embedded in the card body;
an exposed component partially exposed on a front surface of the card body; and
a circuit board to which the internal component and the exposed component are bonded, wherein
the circuit board includes
   a first connection portion to which the internal component is bonded,
   a second connection portion to which the exposed component is bonded, the second connection portion being located at a position different from the first connection portion in a card thickness direction connecting the front surface of the card body and a rear surface on an opposite side of the card body to the front surface, and a connection wiring portion that connects the first connection portion and the second connection portion, the connection wiring portion extending in a direction including the card thickness direction, wherein the connection wiring portion extends along the extending direction of the connection wiring portion while being inclined relative to the card thickness direction and wherein the connection wiring portion includes a first inclined portion extending in a first direction which is inclined relative to the card thickness direction, and a second inclined portion extending in a second direction which is inclined relative to the card thickness direction, the first direction and the second direction being directions different from each other.

13. A card-type medium, comprising:

a card body;

an internal component embedded in the card body;

an exposed component partially exposed on a front surface of the card body; and a circuit board to which the internal component and the exposed component are bonded, wherein the circuit board includes a first connection portion to which the internal component is bonded, a second connection portion to which the exposed component is bonded, the second connection portion being located at a position different from the first connection portion in a card thickness direction connecting the front surface of the card body and a rear surface on an opposite side of the card body to the front surface, and a connection wiring portion that connects the first connection portion and the second connection portion, the connection wiring portion extending in a direction including the card thickness direction, wherein the circuit board includes an antenna extending on a peripheral portion of the card body, and the exposed component and the internal component are located inside the antenna and wherein one of the first connection portion and the second connection portion is located at the same position as the antenna in the thickness direction.

* * * * *